(12) United States Patent
Jang et al.

(10) Patent No.: US 11,910,991 B2
(45) Date of Patent: Feb. 27, 2024

(54) CHARGING APPARATUS FOR MOBILE ROBOT

(71) Applicant: LG ELECTRONICS INC., Seoul (KR)

(72) Inventors: Jaewon Jang, Seoul (KR); Jihyun Lim, Seoul (KR); Youngbin Kim, Seoul (KR); Jinho Chung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 855 days.

(21) Appl. No.: 16/943,050

(22) Filed: Jul. 30, 2020

(65) Prior Publication Data
US 2021/0030228 A1    Feb. 4, 2021

(30) Foreign Application Priority Data

Jul. 31, 2019   (KR) .................. 10-2019-0093484
Dec. 27, 2019   (KR) .................. 10-2019-0176627

(51) Int. Cl.
*H01M 10/46*    (2006.01)
*A47L 9/28*    (2006.01)
(Continued)

(52) U.S. Cl.
CPC ............ *A47L 9/2873* (2013.01); *A47L 9/009* (2013.01); *A47L 9/0063* (2013.01);
(Continued)

(58) Field of Classification Search
CPC . H02J 7/0045; H02J 7/0042; A47L 2201/022; A47L 11/4091; A47L 11/4072;
(Continued)

(56) References Cited

U.S. PATENT DOCUMENTS

2012/0011676 A1   1/2012  Jung et al.
2013/0305481 A1*  11/2013  Jung .................. A47L 11/33
                                              15/301
(Continued)

FOREIGN PATENT DOCUMENTS

CN    102717778 A    10/2012
CN    102849138 A    1/2013
(Continued)

OTHER PUBLICATIONS

Translation of CN 112977112 A (Jun. 18, 2021). (Year: 2021).*
(Continued)

*Primary Examiner* — Edward Tso
(74) *Attorney, Agent, or Firm* — Birch, Stewart, Kolasch & Birch, LLP

(57) ABSTRACT

The present disclosure relates to a charging apparatus for a mobile robot, including a caster guide for guiding a charging terminal, provided for the charging apparatus, and a corresponding terminal, corresponding to the charging terminal, to readily come into contact with each other, in which by determining a contact position of the two terminals in a longitudinal direction using a first guide surface to a third guide surface, and by determining a contact position of the two terminals in a traverse direction using a caster guide having a wide rear portion and a narrow front portion, the charging apparatus for the mobile robot may guide the two terminals to vertically overlap with each other.

26 Claims, 14 Drawing Sheets

(51) Int. Cl.
  *A47L 9/00* (2006.01)
  *A47L 11/282* (2006.01)
  *A47L 11/40* (2006.01)
  *H02J 7/00* (2006.01)

(52) U.S. Cl.
  CPC ......... *A47L 11/282* (2013.01); *A47L 11/4005* (2013.01); *A47L 11/4038* (2013.01); *A47L 11/4072* (2013.01); *A47L 11/4091* (2013.01); *H02J 7/0045* (2013.01); *A47L 2201/022* (2013.01)

(58) Field of Classification Search
  CPC ................ A47L 11/4038; A47L 11/4005; A47L 11/282; A47L 9/0063; A47L 9/2873; A47L 9/009
  USPC .......................................... 320/107, 114, 115
  See application file for complete search history.

(56) References Cited

U.S. PATENT DOCUMENTS

2017/0050311 A1* 2/2017 Yoo .................... G05B 19/4155
2018/0236663 A1    8/2018 Cohen et al.
2019/0059680 A1    2/2019 Fox et al.

FOREIGN PATENT DOCUMENTS

| CN | 109662657 A |   | 4/2019 |
| CN | 112977112 A | * | 6/2021 |
| EP | 3505036 A1 |   | 7/2019 |
| JP | 2006-204758 A |   | 8/2006 |
| JP | 2016-015973 A |   | 2/2016 |
| KR | 10-2012-0007943 |   | 1/2012 |
| KR | 10-2013-0127903 |   | 11/2013 |
| KR | 10-2015-0073735 |   | 7/2015 |
| TW | 201922161 A |   | 6/2019 |

OTHER PUBLICATIONS

Taiwanese Office Action issued in Taiwanese Patent Application No. 109125643, dated Jun. 9, 2021 (7 pages).
International Search Report in PCT/KR2020/001339, dated May 27, 2020 (4 pages).
European Search Report in European Patent Appln. No. 20188623.1 dated Dec. 14, 2020 (7 pages).

* cited by examiner

CHARGING APPARATUS FOR MOBILE ROBOT

TECHNICAL FIELD

The following description relates to a charging apparatus for a mobile robot, and more particularly to a charging apparatus for a mobile robot which includes a caster guide for guiding a charging terminal, provided for the charging apparatus, and a corresponding terminal, corresponding to the charging terminal, to readily come into contact with each other.

BACKGROUND

Robots have been developed for industrial use and have been part of factory automation. Recently, the application filed of robots has been expanded, such that medical robots, aerospace robots, and the like have been developed and household robots that can be used in ordinary homes have also been manufactured. Among these robots, a robot that can travel by itself is called a mobile robot.

A typical example of the mobile robot used in home is a robot cleaner. The robot cleaner is a home appliance which cleans a certain area by sucking dust or foreign materials from the floor while moving autonomously in the area.

Such robot cleaner is generally composed of a cleaning robot and a charging apparatus. The cleaning robot is provided with a rechargeable battery, and may move freely and autonomously using operating power of the battery. The cleaning robot performs cleaning by sucking foreign materials from the floor, and if necessary, returns to the charging apparatus to charge the battery.

Related art 1 discloses: a charging apparatus which is provided with a power source and an electrically connected terminal, and a mobile robot which includes a corresponding terminal to be electrically connected to the terminal of the charging apparatus. Once the terminal of the charging apparatus and the terminal of the mobile robot come into contact with each other, charging of the mobile robot is started.

The mobile robot may be electrically connected to the terminal of the charging apparatus only when the mobile robot moves to the charging apparatus and is docked in a correct position. However, the related art has a problem in that a means for guiding the mobile robot to be mounted in a correct docking area by traveling autonomously.

Related art 2 discloses a mobile robot which is moved by a floor cloth surface. In the related art, the mobile robot includes a first rotating member and a second rotating member, which are disposed with respect to a vertical axis, and fix a pair of floor cloth surfaces disposed in a left-right direction. The mobile robot in the related art moves by the rotation of the first rotating member and the second rotating member, when only the floor cloth surfaces, which are fixed to the first rotating member and the second rotating member, are in contact with the floor.

Particularly, in the related art 1, the bottom surface of the charging apparatus is inclined, such that when the general robot cleaner moves forward with a driving force, the body of the robot cleaner is lifted up, thereby allowing a charging terminal of the mobile robot and a corresponding terminal of the charging apparatus to come into contact with each other. However, in a mobile robot which moves by a frictional force between a spin mop and the floor, the mobile robot has a problem in that a driving force of the mobile robot is too weak to climb a slope to lift up the body, and has no means for finely and accurately adjusting a traveling direction of the mobile robot.

Furthermore, in the general robot cleaner, the robot cleaner moves only by a frictional force of the spin mop, and the level of water stored in a water tank is variable, such that it is impossible to perform mopping effectively, and a problem occurs in a driving force.

Particularly, a general wet-type robot cleaner has a drawback in that it is very difficult to adjust a traveling direction using a frictional force of a spinning cloth, such that the robot cleaner performs cleaning only through random traveling, without pattern traveling which is required for thorough cleaning.

In addition, the general robot cleaner also has a drawback in that when the robot cleaner moves only through random traveling, the robot cleaner may not perform thorough cleaning in an area which is adjacent to the corner or wall of the floor surface.

SUMMARY OF THE INVENTION

In the case of a mobile robot, which moves by a frictional force between a spin mop and a floor, the mobile robot has a weak driving force, and it is required to cover the top and the entire side surface of the mobile robot with a bumper to prevent the mobile robot from climbing the carpet. Also, a corresponding terminal, which is exposed downward outside of a body is required. In consideration of the weak driving force of the spin mop and a structure of a body which requires to be in vertical contact, it is an object of the present disclosure to provide a charging apparatus for the mobile robot, which guides a charging terminal of the charging apparatus and a corresponding terminal, which corresponds to the charging terminal, to vertically come into contact with each other.

In the case of a mobile robot, which moves by a frictional force between a spin mop and a floor, it is very difficult to move in an exact direction. It is another object of the present disclosure to provide a charging apparatus for the mobile robot, in which a guide pin, inserted into a space between two spin mops, guides a docking direction of the mobile robot.

It is yet another object of the present disclosure to provide a charging apparatus for a mobile robot, in which even if the docking direction of the mobile robot is wrong, a mop positioning part for guiding a spin mop has a structure for automatically guiding the docking direction of the mobile robot, thereby allowing the mobile robot to be docked in a correct position.

It is still another object of the present disclosure to provide a charging apparatus for a mobile robot, in which a load, exerted on a floor cloth part disposed at the bottom of the mobile robot, is distributed such that life of the floor cloth may be extended.

It is still another object of the present disclosure to provide a charging apparatus for a mobile robot, in which in order to provide effective mopping and traveling of a robot cleaner, a frictional force between the floor cloth and the floor surface may increase regardless of a change in water level of a water tank, and pattern traveling may be provided for thorough cleaning while the robot cleaner moves accurately.

The objects of the present disclosure are not limited to the aforementioned objects and other objects not described herein will be clearly understood by those skilled in the art from the following description.

In order to achieve the above objects, a charging apparatus for a mobile robot according to an embodiment of the present disclosure is characterized by a caster guide, which guides a moving direction of the mobile robot, and when the mobile robot moves forward, raises a height of one end of the mobile robot to a height above a reference height and lowers the height again.

Further, the charging apparatus of the present disclosure may be characterized by a guide pin, which is disposed on an upper portion of the plate, and extends in a front-rear direction to be inserted into a space between spin mops to guide movement of the mobile robot.

In addition, the charging apparatus may include: a main body having a power module; a plate connected to a lower end of the main body; a charging terminal, which protrudes upward from an upper surface of the plate, and is electrically connected to the power module; and a caster guide which is disposed at the rear of the charging terminal.

The caster guide may include a guide surface for guiding a caster. When a direction, in which the caster enters, is defined as a front direction, the caster guide may include a first guide surface; a second guide surface which is disposed at a front end of the first guide surface and has a slope which is inclined forwardly and downwardly; and a third guide surface, which is disposed at a front end of the second guide surface and has a slope which is inclined forwardly and upwardly. When viewed from the side, the second guide surface and the third guide surface may have a concave part for docking the caster.

The first guide surface may have a slope having a predetermined inclination, in which an inclination of the slope may decrease gradually or may increase gradually; or the first guide surface may have an inflection point, in which an inclination of the slope at a rear end with respect to the inflection point may increase gradually, and an inclination of the slope at a front end with respect to the inflection point may decrease gradually.

The caster guide may further include a separation prevention wall, which is disposed on both sides of the guide surface, and protrudes upward.

The caster guide may further include a stopper, which is connected to a front end of the third guide surface and protrudes upward.

When viewed from the top, a width of a front portion of the caster guide is narrower than a width of a rear end thereof.

The caster guide may further include a guide pin, which protrudes upward from an upper center portion of the plate, and extends in a front-rear direction.

In accordance with an aspect of the present disclosure, the above and other objects can be accomplished by providing a charging apparatus for a mobile robot, the charging apparatus including: a main body having a power module; a plate connected to a lower end of the main body; a charging terminal, which is exposed upward from an upper surface of the plate, and is electrically connected to the power module; and a caster guide, which guides a moving direction of the mobile robot, and when the mobile robot moves forward, raises a height of one end of the mobile robot to a height above a reference height and lowers the height again, wherein the caster guide is disposed at a rear of the charging terminal, and a width of a front end of the caster guide is narrower than a width of a rear end of the caster guide.

The caster guide may include a separation prevention wall, which is disposed on both sides of the guide surface, and protrudes upward.

The caster guide may further include a stopper, which is connected to a front end of the third guide surface and protrudes upward.

The stopper may extend in a direction perpendicular to the plate.

The stopper may have a slope which is inclined forwardly and upwardly.

The stopper may have a slope which is inclined rearwardly and upwardly.

A height $h_3$ of a highest point of the stopper may be greater than the height $h_1$ of the connection portion between the first guide surface and the second guide surface.

A horizontal distance $L_2$ from a vertical central axis to the caster guide may be larger than a horizontal distance $L_1$ from the vertical central axis to the charging terminal.

The charging apparatus may further include a guide pin, which is disposed at an upper center portion of the plate and protrudes upward.

The guide pin may extend along a vertical central axis of the plate.

A front end of the guide pin may be disposed at a rear of the rear end of the caster guide.

A rear end of the guide pin may have a slope which is inclined forwardly and upwardly.

The front end of the guide pin may have a slope which is inclined forwardly and upwardly.

In accordance with another aspect of the present disclosure, the above and other objects can be accomplished by providing a charging apparatus for a mobile robot, the charging apparatus including: a main body having a power module; a plate connected to a lower end of the main body; a first charging terminal and a second charging terminal, which are installed on the plate, are exposed upward from an upper portion of the plate, and are electrically connected to the power module; and a guide pin, which is disposed at a rear of the charging terminals on the upper portion of the plate, and protrudes upward, wherein the guide pin extends in a first direction, and an extension line of the guide pin passes through a space between the first charging terminal and the second charging terminal.

The charging apparatus may further include a caster guide, which includes a guide surface for guiding the caster, and a separation prevention wall which defines a surface crossing the guide surface at a side end of the guide surface.

The separation prevention wall may include a first separation prevention wall and a second separation prevention wall, which protrude upward from both side ends of the guide surface.

The charging apparatus may further include a mop positioning part, which is disposed at a rear of the caster guide on the plate, and defines an area in which spin mops of the mobile robot are positioned.

When viewed from above, the mop positioning part may be defined as a recess region with open front and rear portions, and closed left and right portions.

The guide pin may protrude upward from the mop positioning part.

Details of other embodiments are included in the detailed description and the accompanying drawings.

According to the present disclosure, the charging apparatus for the mobile robot has one or more of the following effects.

Firstly, when viewed from the side, an arrangement of an upward slope-downward slope-upward slope-stopper is provided, thereby allowing terminals to be readily directed toward a position, in which the terminals may come into contact with each other, in a longitudinal direction (vertical central axis direction).

Secondly, a caster guide has a wide rear portion, into which a caster enters, and a narrow front portion, in which the caster is seated, thereby allowing terminals to be readily directed toward a position, in which the terminals may come into contact with each other, in a traverse direction (left-right direction).

Thirdly, a separation prevention wall is further provided on both sides of a guide surface, thereby preventing separation.

Fourthly, a guide pin, which extends in a front-rear direction, is further included, allowing terminals to be readily directed toward a position, in which the terminals may come into contact with each other.

Fifthly, the charging apparatus and the caster guide protrude upward from the plate, such that a portion of load on the mobile robot is exerted on the charging terminal during docking of the mobile robot, thereby increasing the contact between the terminals and extending life of a floor cloth.

Sixthly, in the present disclosure, the body has a circular shape, and a dry-type module does not protrude outside of the body, such that rotation may be freely made at any position in an area to be cleaned, and a wide width of an agitator may be maintained, thereby allowing a wide range of cleaning, and performing mopping while collecting relatively large foreign materials.

However, the effects of the present disclosure are not limited to the aforesaid, and other effects not described herein will be clearly understood by those skilled in the art from the following description of the appended claims.

DETAILED DESCRIPTION

Figure 1:
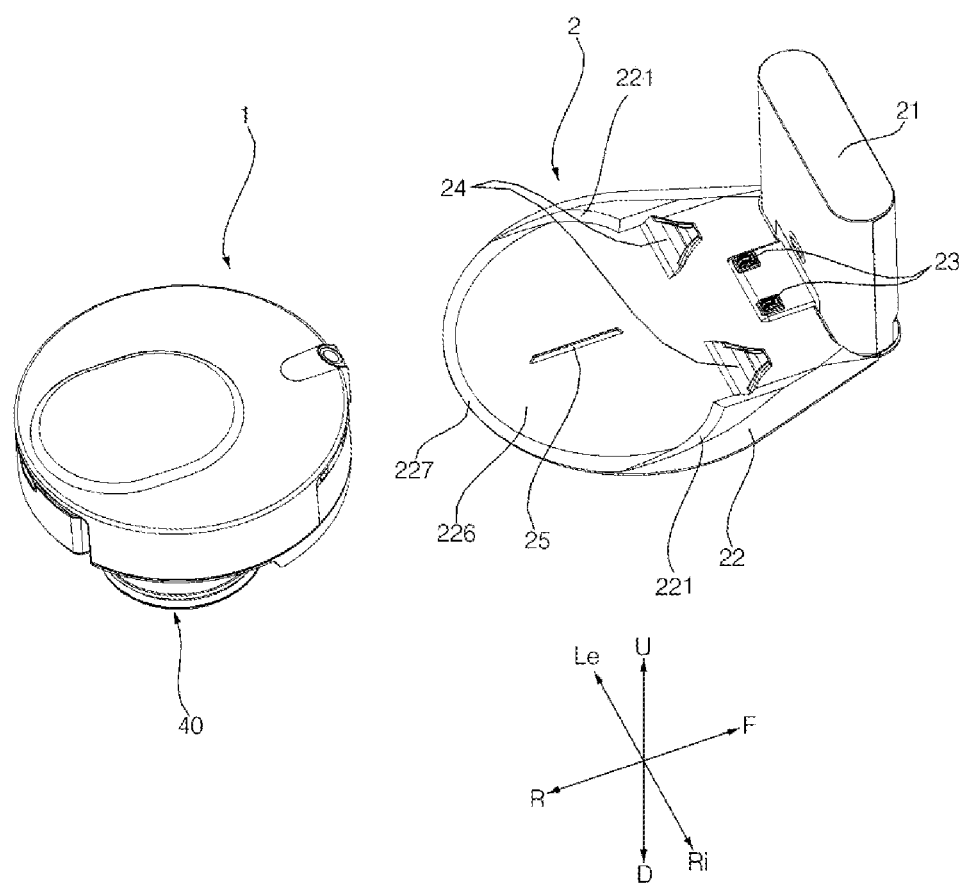
FIG. 1 is a perspective view of a robot cleaner system, including a mobile robot and a charging apparatus, according to an embodiment of the present disclosure.

Advantages and features of the present disclosure and methods for accomplishing the same will be more clearly understood from exemplary embodiments described below with reference to the accompanying drawings. However, the present disclosure is not limited to the following embodiments, but may be implemented in various different forms. The embodiments are provided only to complete disclosure of the present disclosure and to fully provide a person having ordinary skill in the art, to which the present disclosure pertains, with the category of the present disclosure, and the present disclosure will be defined by the scope of the appended claims. Wherever possible, like reference numerals generally denote like elements through the specification.

In the following description, the terms indicating directions, such as "front (F)," "rear (R)," "left (Le)," "right (RI)," "up (U)," "down (D)," and the like, are defined based on a traveling direction of a mobile robot. A direction, in which the mobile robot is docked on a charging apparatus, is defined as a front direction, and a direction opposite to the front direction is defined as a rear direction. A direction of the left side/right side of the charging apparatus may be determined based on a position when viewed from above. These terms, however, are used merely to provide a better understanding of the present disclosure, and it is apparent that the directions can be defined differently by difference references.

For example, a direction parallel to a virtual line, formed by connecting central axes of a left spin mop and a right spin mop, is defined as a left-right direction; a direction, which vertically intersects with the left-right direction, is parallel to the central axes of the spin mops, or has an error angle of less than 5 degrees, is defined as an up-down direction; and a direction, which vertically intersects with the left-right direction and the up-down direction, is defined as a front-rear direction. In this case, the front direction may refer to a main traveling direction of the mobile robot, or a main traveling direction during pattern traveling of the mobile robot. Here, the main traveling direction may refer to a value, obtained by summing up vectors of directions while traveling during a predetermined period of time.

The terms, "first," "second," "third," etc., used in this disclosure, do not necessarily denote any order, importance, or hierarchy, but rather the terms are used to merely distinguish one element from another. For example, an embodiment may be configured to include only a second element without a first element.

The term "floor cloth" used herein may be made of various materials, such as fabric or paper, and may be intended for repetitive use by washing or for one-time use.

The present disclosure may be applied to a mobile robot which may be manually moved by a user, a robot cleaner which may move autonomously, and the like. The following description will be given using a mobile robot as an example.

A mobile robot system of the present disclosure includes a mobile robot and a charging apparatus for charging the mobile robot. Hereinafter, the mobile robot will be described in detail.

Figure 2A:
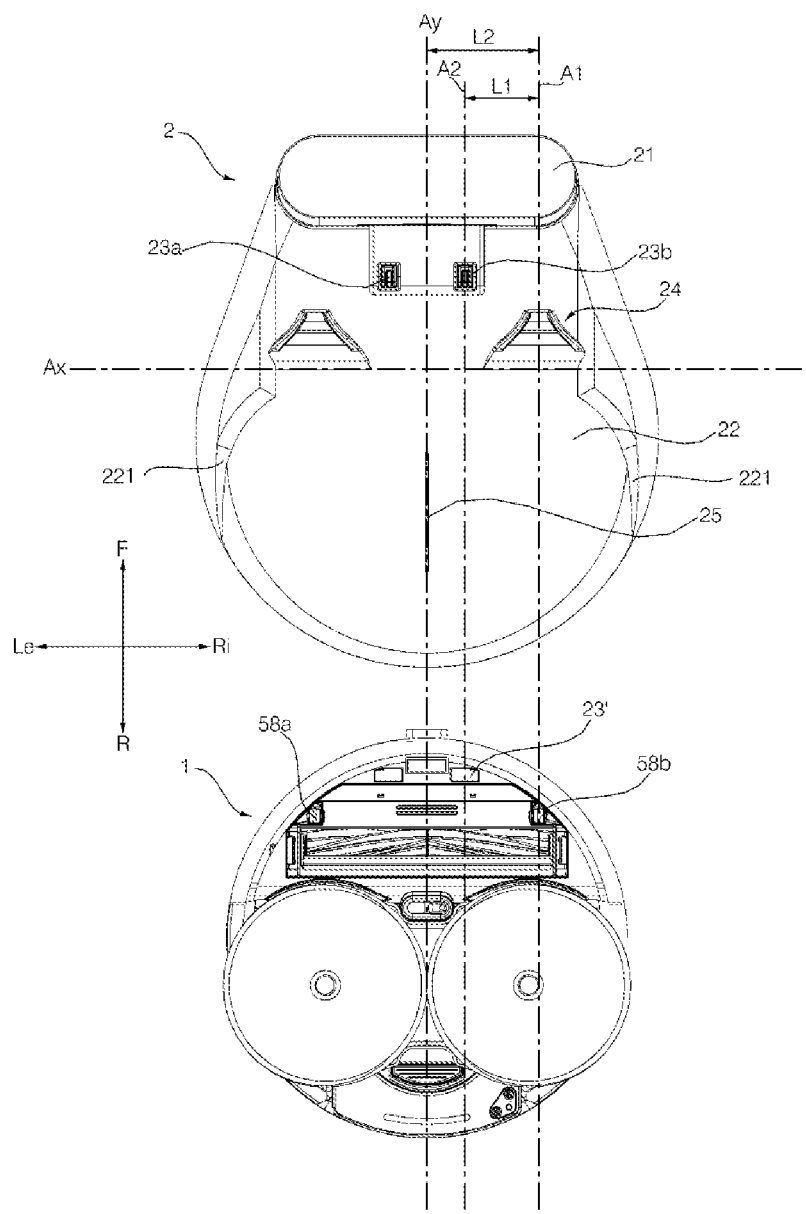
FIG. 2A is a bottom view of the mobile robot of FIG. 1 and a plan view of the charging apparatus of FIG. 1.
Figure 2B:
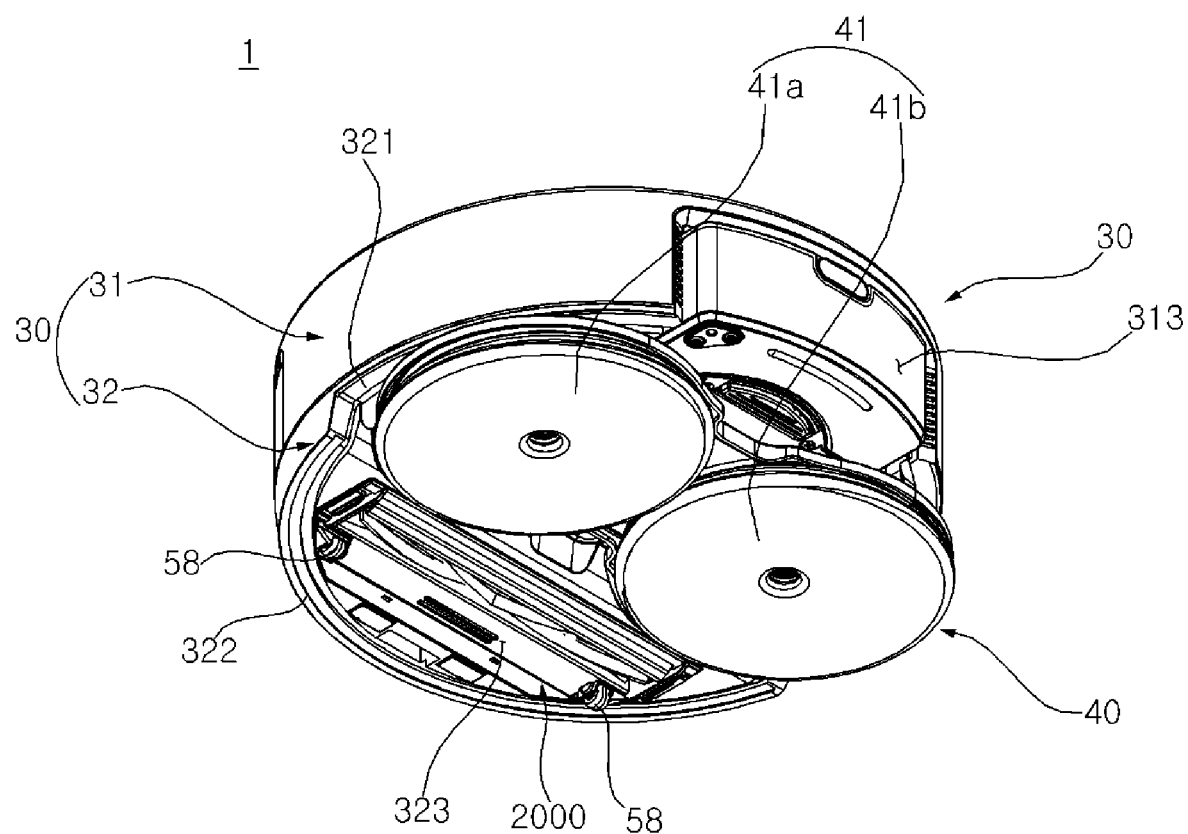
FIG. 2B is a perspective view of the mobile robot of FIG. 1.
Figure 2C:
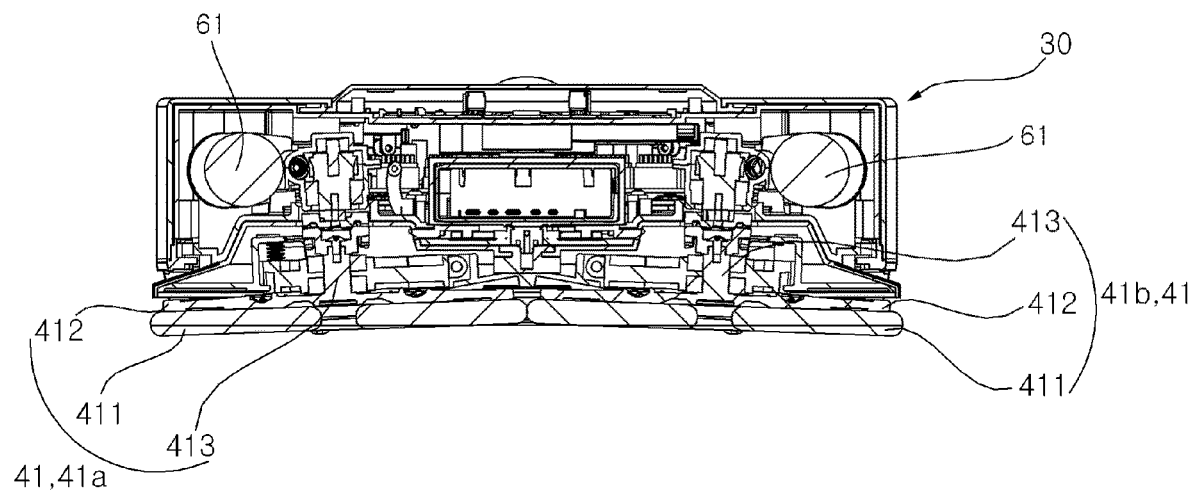
FIG. 2C is a front cross-sectional view of the mobile robot of FIG. 1.

Referring to FIGS. 2B and 2C, the cleaner 1 according to an embodiment of the present disclosure includes a body 30 including a controller. The robot cleaner 1 includes a mop module 40 configured to mop a floor while being in contact with the floor (surface to be cleaned). The cleaner 1 includes a sweep module 2000 configured to collect foreign materials from the floor.

The mop module 40 is disposed on a lower side of the body 30 and supports the body 30. The sweep module 50 is disposed on a lower side of the body 30 and supports the body 30. In the embodiment, the body 30 is supported by the mop module 40 and the sweep module 2000. The body 30 forms an exterior of the cleaner 1. The body 30 is disposed to connect the mop module 40 and the sweep module 2000.

The mop module 40 may form an exterior. The mop module 40 is disposed on a lower side of the body 30 and at the rear of the sweep module 2000. The mop module 40 provides a driving force for movement of the cleaner 1. In order to move the cleaner 1, the mop module 40 is preferably disposed at the rear of the cleaner 1.

The mop module 40 includes at least one floor cloth 411 which wipes the floor while rotating. The mop module 40 includes at least one spin mop 41, which when viewed from above, rotates clockwise or counter-clockwise. The spin mop 41 is in contact with the floor.

In the embodiment, the mop module 40 includes a pair of spin mops 41a and 41b. The pair of spin mops 41a and 41b rotate clockwise or counter-clockwise when viewed from above, and mops the floor while rotating. Of the pair of the spin mops 41a and 41b, a spin mop, which is located at the left side when viewed from the front in a traveling direction of the cleaner 1, is defined as a left spin mop 41a, and a spin mop located at the right side is defined as a right spin mop 41b.

Each of the left spin mop 41a and the right spin mop 41b rotates about its own rotation axis. The rotation axis is disposed vertically. The left spin mop 41a and the right spin mop 41b may rotate independently of each other.

Each of the left spin mop 41a and the right spin mop 41b includes a rotary plate 412 and a spin shaft 414, to which the floor cloth 411 is attached. Each of the left spin mop 41a and the right spin mop 41b includes a water accommodating part 413.

The sweep module 2000 may form an exterior. The sweep module 2000 is disposed at the front of the mop module 40. In order to prevent the mop module 40 from first coming into contact with foreign materials on the floor, the sweep module 2000 is desirably disposed at the front in a traveling direction of the cleaner 1.

The sweep module 2000 is spaced apart from the mop module 40. The sweep module 2000 is disposed at the front of the mop module 40 and is in contact with the floor. The sweep module 2000 collects foreign materials from the floor.

While being in contact with the floor, the sweep module 2000 collects foreign materials, located in front of the sweep module 2000, into the inside while the cleaner 1 moves. The sweep module 2000 is disposed on a lower side of the body 20. The sweep module 2000 has a horizontal width which is smaller than a horizontal width of the mop module 40.

The body 30 includes a case 31, which forms an exterior of the cleaner 1, and a base 32 which is disposed on a lower side the case 31.

The case 31 forms a side surface and a top surface of the body 30. The base 32 forms a bottom surface of the body 30.

In the embodiment, the case 31 has a cylindrical shape with an open bottom surface. When viewed from the top, the overall shape of the case 31 is a circle. As a plane of the case 31 has a circular shape, a radius of gyration during rotation may be minimized.

The case 31 includes: a top wall 311 having a circular overall shape; and a side wall 312 which is integrally formed with the top wall 311 and extends downward from the edge of the top wall 311.

The side wall 312 is partially open. An open portion of the side wall 312 is defined as a water tank insertion hole 313, through which a water tank 81 is detachably installed. The water tank insertion hole 313 is formed at the rear in a traveling direction of the cleaner 1. As the water tank 81 is inserted through the water tank insertion hole 313, the water tank insertion hole 313 is preferably disposed adjacent to the mop module 40.

The mop module 40 is connected to the base 32, and the sweep module 50 is connected to the base 32. A controller Co and a battery Bt are provided in an internal space formed by the case 31 and the base 32. Further, a mop driving part 60 is disposed in the body 30. A water supply module is disposed at the body 30.

Figure 2D:
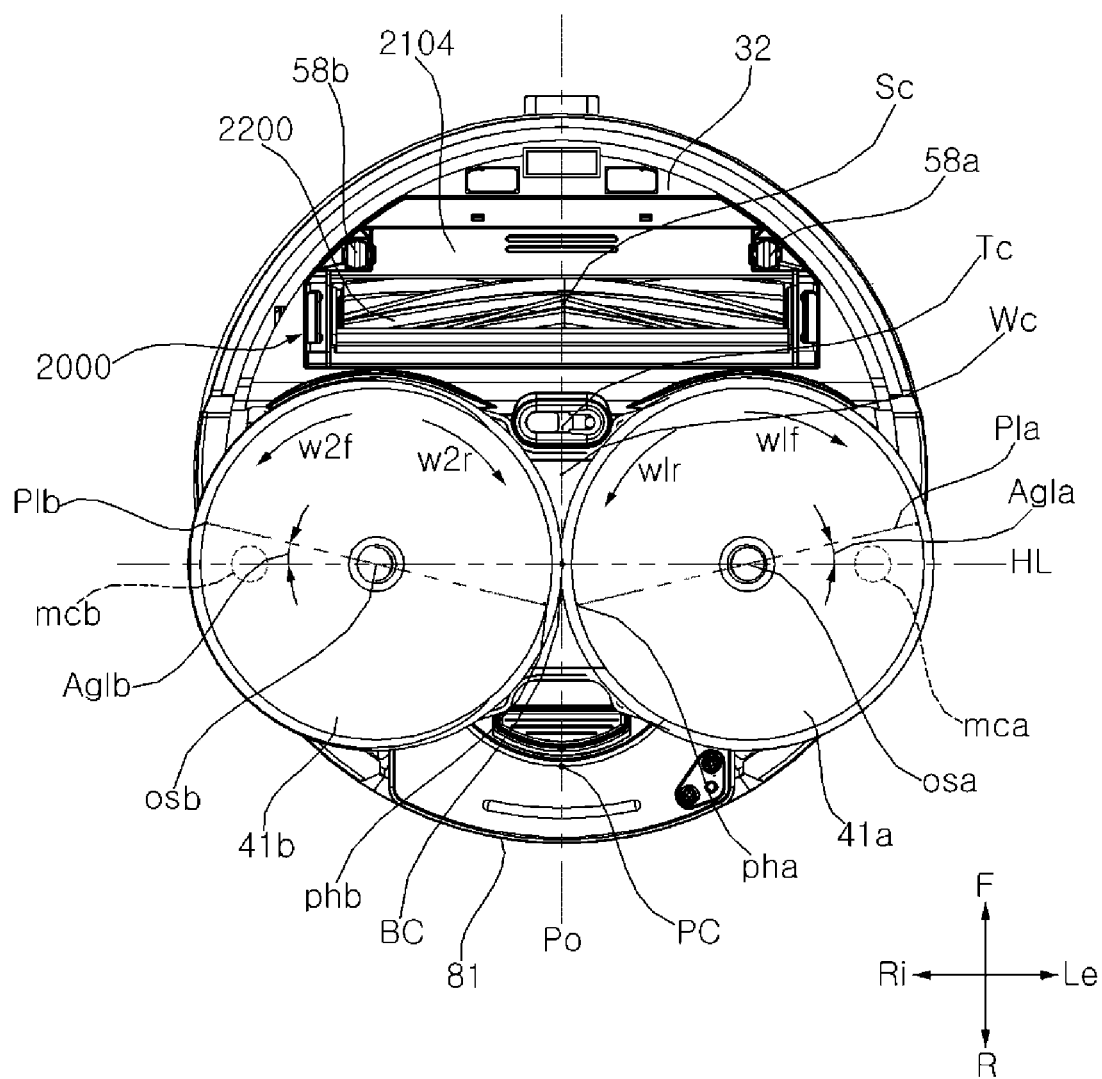
FIG. 2D is a bottom view of FIG. 1 illustrating a center of mass and a lowest end of a spin mop according to an embodiment of the present disclosure.

FIG. 2D illustrates a point, at which a spin shaft Osa and a lower surface of the left spin mop 41a intersect, and a point at which a spin shaft Osb and a lower surface of the right spin mop 41b intersect. When viewed from the bottom, a direction in which the left spin mop 41a spins clockwise is defined as a first forward direction w1f, and a direction in which the left spin mop 41a spins counter-clockwise is defined as a first reverse direction w1r. When viewed from the bottom, a direction in which the right spin mop 41b spins counter-clockwise is defined as a second forward direction w2f, and a direction in which the right spin mop 41b spins clockwise is defined as a second reverse direction w2r. Further, when viewed from the bottom, "an acute angle, formed between a tilt direction of the lower surface of the left spin mop 41a and a left-right axis thereof," and "an acute angle, formed between a tilt direction of the lower surface of the right spin mop 41b and a left-right axis thereof," are defined as tilt direction angles Ag1a and Ag1b. The tilt direction angle Ag1a of the left spin mop 41a may be equal to the tilt direction angle Ag1b of the right spin mop 41b. Further, referring to FIG. 6, "an angle of the lower surface I of the left spin mop 41a with respect to a virtual horizontal plane H" and "an angle of the lower surface I of the right spin mop 41b with respect to a virtual horizontal plane H" are defined as tilt angles Ag2a and Ag2b.

In this case, a right end of the left spin mop 41a and a left end of the right spin mop 41b may come into contact with, or may be adjacent to, each other. Accordingly, a gap in mopping between the left spin mop 41a and the right spin mop 41b may be reduced.

When the left spin mop 41a spins, a point P1a of the lower surface of the left spin mop 41a, to which a maximum frictional force is applied from the floor, is located on the left side of a center of rotation of the left spin mop 41a. As a greater load is transmitted to a ground surface at the point P1a of the lower surface of the left spin mop 41a than other points, the maximum frictional force may be generated at the point P1a. In the embodiment, the point P1a is located at a front left side of the center of rotation Osa, but in other embodiment, the point P1a may be disposed exactly at the left side or at the rear left side with respect to the center of rotation Osa.

When the right spin mop 41b spins, a point P1b of the lower surface of the right spin mop 41b, to which a maximum frictional force is applied from the floor, is located at the right side of a center of rotation Osb of the right spin mop 41b. As a greater load is transmitted to a ground surface at the point at the point P1b of the lower surface of the right spin mop 41b than other points, the maximum frictional force may be generated at the point P1b. In the embodiment, the point P1b is located at a front right side of the center of rotation Osb, but in other embodiment, the point P1b may be disposed exactly at the right side or at the rear right side with respect to the center of rotation Osb.

The lower surface of the left spin mop 41a and the lower surface of the right spin mop 41b may be tilted. The tilt angles Ag2a and Ag2b of the left spin mop 41a and the right spin mop 41b may form an acute angle. The tilt angles Ag2a and Ag2b are at the points P1a and P1b, at which the maximum frictional force is exerted, and the entire lower area of the floor cloth 411 may be formed in a small size to touch the floor during spinning of the left spin mop 41a and the right spin mop 41b.

The overall lower surface of the left spin mop 41a is inclined leftwards and downwards. The overall lower surface of the right spin mop 41b is inclined rightwards and downwards. Referring to FIG. 6, the lower surface of the lower spin mop 41a has a lowest point P1a on the left side. The lower surface of the left spin mop 41a has a highest point Pha on the right side. The lower surface of the right spin mop 41b has a lowest point P1b on the right side. The lower surface of the right spin mop 41b has a highest point Pha on the left side.

Depending on embodiments, the tilt direction angles Ag1a and Ag1b may be zero degrees. Further, depending on embodiments, when viewed from the bottom, a tilt direction of the lower surface of the left spin mop 41a may form the tilt direction angle Ag1a in a clockwise direction with respect to the left-right axis, and a tilt direction of the lower surface of the right spin mop 41b may form the tilt direction angle Ag1b in a counter-clockwise direction with respect to the left-right axis. In the embodiment of the present disclosure, when viewed from the bottom, a tilt direction of the lower surface of the left spin mop 41a may form the tilt direction angle Ag1a in a counter-clockwise direction with respect to the left-right axis, and a tilt direction of the lower surface of the right spin mop 41b may form the tilt direction angle Ag1b in a clockwise direction with respect to the left-right axis.

The cleaner 1 moves with a frictional force with a ground surface, which is generated by the mop module 40.

The mop module 40 may generate "a forward movement frictional force" for moving the body 30 forward, or a "rearward movement frictional force" for moving the body 30 backwards. The mop module 40 may generate a "leftward moment frictional force" for turning the body 30 to the left, or a "rightward moment frictional force" for turning the body 30 to the right. The mop module 40 may generate a frictional force by combining any one of the forward movement frictional force and the rearward movement frictional force with any one of the leftward moment frictional force and the rightward moment frictional force.

In order for the mop module 40 to generate the forward movement frictional force, the left spin mop 41a spins at a predetermined rpm R1 in the first forward direction w1f, and the right spin mop 41b spins at the predetermined rpm R1 in the second forward direction w2f.

In order for the mop module 40 to generate the rearward movement frictional force, the left spin mop 41a spins at a predetermined rpm R2 in the first reverse direction w1r, and the right spin mop 41b spins at the predetermined rpm R2 in the second reverse direction w2f.

In order for the mop module 40 to generate the rightward moment frictional force, the left spin mop 41a spins at a predetermined rpm R3 in the first forward direction w1f, and the right spin mop 41b (i) spins in the second reverse direction w2r, (ii) is stopped without spinning, or (iii) spins at an rpm R4, which is less than the rpm R3, in the second forward direction w2f.

In order for the mop module 40 to generate the leftward moment frictional force, the right spin mop 41b spins at a predetermined rpm R5 in the second forward direction w2f, and the left spin mop 41a (i) spins in the first reverse direction w1f, (ii) is stopped without spinning, or (iii) spins at an rpm R6, which is less than the rpm R5, in the first forward direction w1f.

Hereinafter, an arrangement of each element for improving stability in a left-right direction and a front-rear direction while increasing a frictional force of the spin mops 41 located at the left and right sides, and allowing safe traveling regardless of a water level in a water tank 81.

Figure 2E:
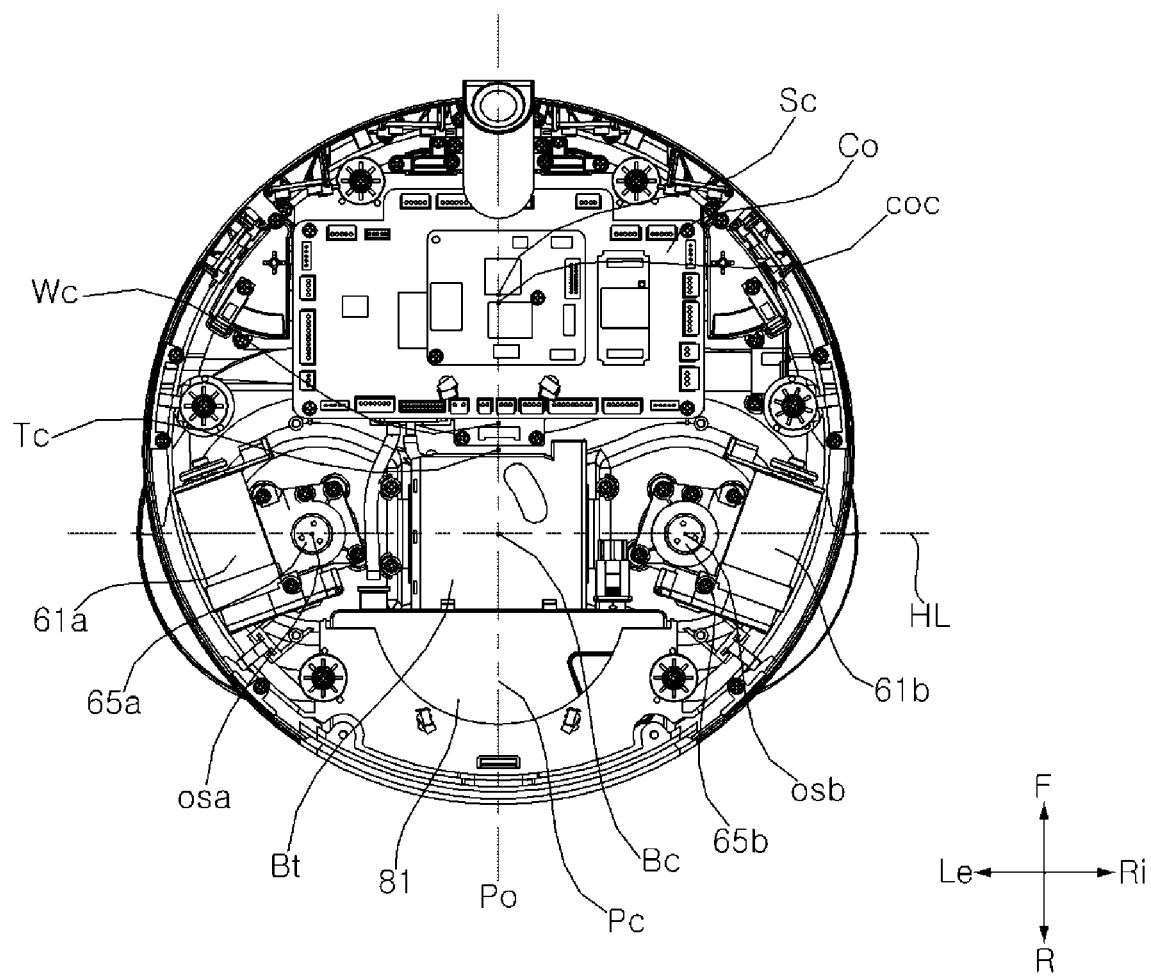
FIG. 2E is a plan view of a center of mass as seen from above, in which a case is removed from a body in FIG. 1.
Figure 3:
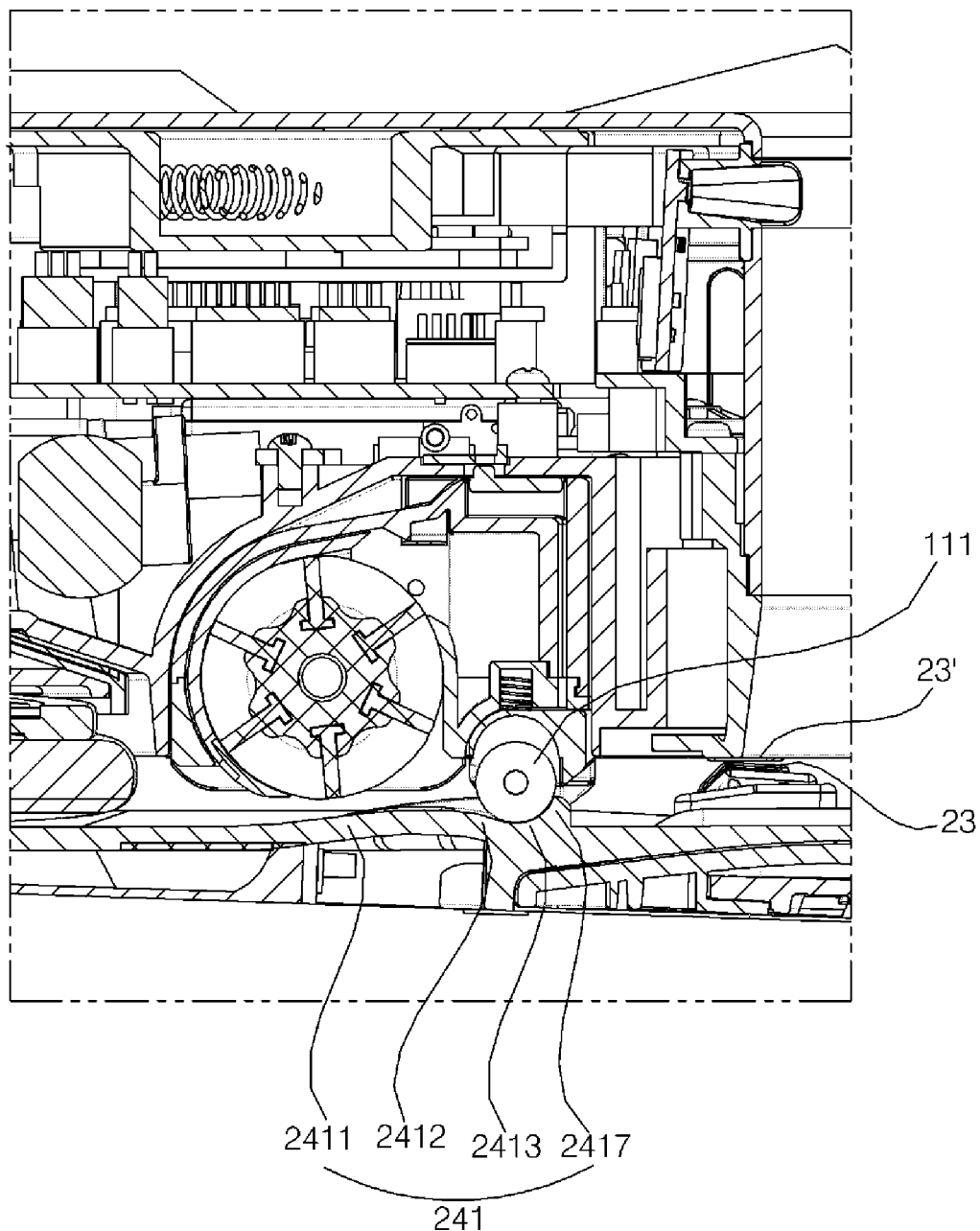
FIG. 3 is a right cross-sectional view of a mobile robot combined with a charging apparatus.

Referring to FIGS. 2D and 2E, in order to increase a frictional force of the spin mop 41 and to prevent eccentricity from occurring in one direction when the mobile robot rotates, a battery Bt and the mop motor 61, which are relatively heavy, may be disposed at the top of the spin mop 41.

Specifically, the left mop motor 61a is disposed above the left spin mop 41a, and the right mop motor 61b is disposed above the right spin mop 41b. That is, at least a portion of the left mop motor 61a may overlap vertically with the left spin mop 41a. It is preferred that the entire portion of the left mop motor 61a may overlap vertically with the left spin mop 41a. At least a portion of the right mop motor 61b may overlap vertically with the right spin mop 41b. It is preferred that the entire portion of the right mop motor 61b may overlap vertically with the right spin mop 41b.

More specifically, the left mop motor 61a and the right mop motor 61b may overlap vertically with a virtual central horizontal line HL, formed by connecting the spin shaft Osa of the left spin mop 41a and the spin shaft Osb of the right spin mop 41b. It is preferred that a center of mass MCa of the left mop motor 61a and a center of mass MCb of the right mop motor 61b may overlap vertically with the virtual central horizontal line HL which is formed by connecting the spin shaft Osa of the left spin mop 41a and the spin shaft Osb of the right spin mop 41b. Alternatively, a geometric center of the left mop motor 61a and a geometric center of the right mop motor 61b may overlap vertically with the virtual central horizontal line HL which is formed by connecting the spin shaft Osa of the left spin mop 41a and the spin shaft Osb of the right spin mop 41b. In this case, the left mop motor 61a and the right mop motor 61b are symmetrical to each other with respect to a vertical line Po of the robot cleaner.

As the center of mass MCa of the left mop motor 61a and the center of mass MCb of the right mop motor 61b are symmetrical to each other without deviating from each spin mop 41, a frictional force of the spin mop 41 may increase, and driving performance and horizontal balance may be maintained.

Hereinafter, the spin shaft OSa of the left spin mop 41a is defined as a left spin shaft Osa, and the spin shaft Osb of the right spin mop 41b is defined as a right spin shaft Osb.

As the water tank 81 is disposed rearward of the central horizontal line HL, and the amount of water in the water tank 81 is variable, the left mop motor 61a may be biased leftward from the left spin shaft Osa in order to maintain a stable balance in the front-rear direction regardless of a water level in the water tank 81. The left mop motor 61a may be biased to the front left side from the left spin shaft Osa. It is preferred that the geometric center or the center of mass MCa of the left mop motor 61a is biased leftward from the left spin shaft Osa, or the geometric center or the center of mass MCa of the left mop motor 61a is biased to the front left side from the left spin shaft Osa.

The right mop motor 61b may be biased rightward from the right spin shaft Osb. The right mop motor 61b may be biased to the front right side from the right spin shaft Osb. It is preferred that the geometric center or the center of mass MCb of the right mop motor 61b is biased rightward from the right spin shaft Osb, or the geometric center or the center of mass MCb of the right mop motor 61b is biased to the front right side from the right spin shaft Osb.

As the left mop motor 61a and the right mop motor 61b apply pressure at positions which are biased toward a front outer side from the center of each spin mop 41, the pressure is concentrated on the front outer side of each spin mop 41, such that driving performance may be improved by the rotational force of the spin mop 41.

The left spin shaft Osa and the right spin shaft Osb are disposed rearward of the center of the body 30. The central horizontal line HL is disposed rearward of a geometric center of the body 30 and a center of mass WC of the mobile robot. The left spin shaft Osa and the right spin shaft Osb are spaced apart equally from the vertical line Po of the mobile robot.

A left master joint 65a is disposed on the left spin mop 41a, and a right master joint 65b is disposed on the right spin mop 41b.

In the embodiment of the present disclosure, a single battery Bt is installed. At least a portion of the battery Bt is disposed on the left spin mop 41a and the right spin mop 41b. As the battery Bt, which is relatively heavy, is disposed on the spin mop 41, a frictional force of the spin mop 41 may increase, and eccentricity occurring due to the rotation of the mobile robot may be reduced.

Specifically, a portion of the left side of the battery Bt may vertically overlap with the left spin mop 41a, and a portion of the right side of the battery Bt may vertically overlap with the right spin mop 41b. The battery Bt may vertically overlap with the central horizontal line HL and may vertically overlap with the vertical line Po of the mobile robot.

More specifically, a center of mass BC or a geometric center of the battery Bt may be disposed on the vertical line Po of the mobile robot, and may be disposed on the central horizontal line HL. In this case, the center of mass BC or the geometric center of the battery Bt may be disposed on the vertical line Po of the mobile robot, may be disposed forward of the central horizontal line HL, or may be disposed rearward of the geometric center Tc of the body 30.

The center of mass BC or the geometric center of the battery Bt may be disposed forward of the water tank 81 or the center of mass PC of the water tank 81. The center of mass BC or the geometric center of the battery Bt may be disposed rearward of a center of mass SC of the sweep module 2000.

As one battery Bt is interposed between the left spin mop 41a and the right spin mop 41b, and is disposed on the central horizontal line HL and the vertical line Po of the mobile robot, the heavy battery Bt maintains the balance during the spinning of the spin mops 41, and puts weight on the spin mops 41, thereby increasing a frictional force of the spin mops 41.

The battery Bt may be disposed at the same height (height of a lower end) as the left mop motor 61a and the right mop motor 61b. The battery Bt may be interposed between the left mop motor 61a and the right mop motor 61b. The battery Bt is disposed in an empty space between the left mop motor 61a and the right mop motor 61b.

At least a portion of the water tank 81 is disposed on the left spin mop 41a and the right spin mop 41b. The water tank 81 may be disposed rearward of the central horizontal line HL, and may vertically overlap with the vertical line Po of the mobile robot.

More specifically, the center of mass PC or a geometric center of the water tank 81 may be disposed on the vertical line Po of the mobile robot and disposed forward of the central horizontal line HL. In this case, the center of mass PC or the geometric center of the water tank 81 may be disposed on the vertical line Po of the mobile robot and disposed rearward of the central horizontal line HL. Here, the position of the center of mass PC or the geometric center of the water tank 81, which is disposed rearward of the central horizontal line HL, indicates that the center of mass PC or the geometric center of the water tank 81 vertically overlaps with one region which is positioned rearward of the central horizontal line HL. In this case, the center of mass PC or the geometric center of the water tank 81 may vertically overlap with the body 30 without deviating from the body 30.

The center of mass PC or the geometric center of the water tank 81 may be disposed rearward of the center of mass BC of the battery Bt. The center of mass PC or the geometric center of the water tank 81 may be disposed rearward of the center of mass SC of the sweep module 2000.

The water tank 81 may be disposed at the same height (height of a lower end) as the left mop motor 61a and the right mop motor 61b. The water tank 81 may be disposed rearward of a space between the left mop motor 61a and the right mop motor 61b.

The sweep module 2000 is disposed forward of the spin mops 41, the battery Bt, the water tank 81, a mop driving part 60, the right mop motor 61b, and the left mop motor 61a in the case 30.

The center of mass PC or a geometric center of the sweep module 2000 may be disposed on the vertical line Po of the mobile robot, and may be disposed forward of the geometric center Tc of the body 30. The body 30 may have a circular shape when viewed from the top, and the base 32 may have a circular shape. The geometric center Tc of the body 30 refers to the center when the body 30 has a circular shape. Specifically, when viewed from the top, the body 30 is a circle with a radius error being less than 3%.

Specifically, the center of mass SC or the geometric center of the sweep module 2000 may be disposed on the vertical line Po of the mobile robot, and may be disposed forward of the center of mass BC of the battery Bt, the center of mass of PC of the water tank 81, the center of mass MCa of the left mop motor 61a, the center of mass MCb of the right mop motor 61b, and the center of mass WC of the mobile robot.

It is preferred that the center of mass SC or the geometric center of the sweep module 2000 is disposed forward of the central horizontal line HL and the front end of the spin mops 41.

As described above, the sweep module 2000 has a dust housing 2100 having a storage space 2104, an agitator 2200, and a sweep motor 2330.

The agitator 2200 is rotatably installed in the sweep module 2000, and is disposed rearward of the storage space 2104, such that the agitator 2200 may maintain a length appropriate to cover the left and right spin mops 41a and 41b, without protruding outside of the body 30.

A rotational axis of the agitator 2200 is parallel to the central horizontal line HL, and the center of the agitator 2200 is disposed on the virtual vertical line Po of the mobile robot, thereby allowing large foreign materials, introduced by the spin mops 41, to be removed effectively by the agitator 2200. The rotational axis of the agitator 2200 is disposed forward of the geometric center Tc of the body 30. The length of the agitator 2200 is desirably larger than a distance between the left spin shaft Osa and the right spin shaft Osb. The rotational axis of the agitator 2200 may be disposed adjacent to the front end of the spin mop 41.

The sweep module 2000 may further include a left caster 58a and a right caster 58b, which are provided on both ends thereof, and which come into contact with the floor. The left caster 58a and the right caster 58b may roll while being in contact with the floor, and may be moved vertically by an elastic force. The left caster 58a and the right caster 58b support the sweep module 2000 and a portion of the body 30. The left caster 58a and the right caster 58b protrude downward from a lower end of the dust housing 2100.

The left caster 58a and the right caster 58b are disposed parallel to the central horizontal line HL, and may be disposed forward of the central horizontal line HL and the agitator 2200. A virtual line, formed by connecting the left caster 58a and the right caster 58b, may be disposed forward of the central horizontal line HL, the agitator 2200, and the geometric center Tc of the body 30. In this case, the left caster 58a and the right caster 58b may be symmetrical to each other with respect to the vertical line Po of the mobile robot. The left caster 58a and the right caster 58b may be equally spaced apart from the vertical line Po of the mobile robot.

In a virtual square, formed by sequentially connecting the left caster 58a, the right caster 58b, the right spin shaft Osb, and the left spin shaft Osa, the geometric center Tc of the body 30, the center of mass WC of the mobile robot, the center of mass SC of the sweep module 2000, and the center of mass BC of the battery Bt are disposed; and the battery Bt, which is relatively heavy, the left spin shaft Osa, and the right spin shaft Osb are disposed adjacent to the central horizontal line HL. In this arrangement, a primary load of the mobile robot is applied to the spin mops 41, and a remaining secondary load is applied to the left caster 58a and the right caster 58b.

If the sweep motor 2330 is disposed on the vertical line Po of the mobile robot, or if the sweep motor 2330 is disposed on one side with respect to the vertical line Po of the mobile robot, the pump 85 is disposed on the other side, such that a combined center of mass of the sweep motor 2330 and the pump 85 may be disposed on the vertical line Po of the mobile robot.

Accordingly, the center of mass of the mobile robot, which is biased forward, may be maintained regardless of a water level in the water tank 81 which is disposed rearward. In this case, while increasing a frictional force of the spin mop 41, the center of mass WC of the mobile robot may be positioned near the geometric center Tc of the body 30, thereby enabling stable movement.

A center of mass COC or a geometric center of a controller Co may be disposed forward of the geometric center Tc of the body 30 and the central horizontal line HL. At least 50% or more of the controller Co may vertically overlap with the sweep module 2000.

The center of mass WC of the mobile robot may be disposed on the vertical line Po of the mobile robot; may be disposed forward of the central horizontal line HL; may be disposed forward of the center of mass BC of the battery BC; may be disposed forward of the center of mass PC of the water tank 81; may be disposed rearward of the center of mass SC of the sweep module 2000; and may be disposed rearward of the left caster 58a and the right caster 58b.

These elements may be disposed to be symmetrical to each other with respect to the vertical line Po of the mobile robot; or by considering their weight, the center of mass WC of the mobile robot may be positioned on the vertical line Po of the mobile robot. When the center of mass WC of the mobile robot is positioned on the vertical line Po of the mobile robot, there is an effect of improving stability in a left-right direction.

The caster 58 is disposed at a lower side of the mobile robot, and partially supports the load of the mobile robot. The caster 58 may be disposed at the front of the mobile robot. The caster 58 may be disposed on both front sides of the mobile robot. The caster 58 may be disposed forward of the mop module 40. The caster 58 may be disposed forward of the sweep module 2000. The caster 58 has wheels to move the mobile robot.

One portion of each spin mop 41 may vertically overlap with the body 30, and the other portion thereof may be exposed outside of the body 30.

A percentage of the overlapping portion of each spin mop 41 with the body 30 is preferably in a range of 85% to 95% of each spin mop 41. Specifically, an included angle between a line, formed by connecting the right end of the body 30 and the right end of the right spin mop 41b, and a vertical line, formed by horizontally connecting the right end of the body 30 and the central vertical line Po, may be in a range of zero degrees to five degrees.

A length of the region of each spin mop 41, which is exposed outside of the body 30, is preferably in a range of ½ to ⅐ of a radius of each spin mop 41. The length of the region of each spin mop 41, which is exposed outside of the body 30, may refer to a distance between one end of each pin mop 41, which is exposed outside of the body 30, to the spin shaft of each spin mop 41.

A distance between the end of the region of each spin mop 41, which is exposed outside of the body 30, and the geometric center Tc of the body 30 may be greater than a mean radius of the body 30.

By considering a relationship with the sweep module 2000, a position, at which each spin mop 41 is exposed, is between aside portion and a rear portion of the body 30. That is, if quadrants are sequentially positioned in a clockwise direction when the body 30 is viewed from below, the position, at which each spin mop 41 is exposed, may be located in the second quadrant or the third quadrant.

A charging apparatus 2 of the mobile robot including a caster guide 24 will be described below with reference to FIGS. 1 and 2A.

Along a first guide line A1 (dashed dotted line) of FIG. 2, the mobile robot enters the charging apparatus 2 to be docked therewith.

The charging apparatus 2 includes a main body 21 including a power module, and a plate 22 coupled to a lower end of the main body 21. The mobile robot may be docked on the plate 22.

The plate 22 includes the caster guide 24, to guide the caster provided at the front lower end of the mobile robot. The plate 22 guides the mobile robot to a docking area through the caster guide 24, and guides a charging terminal 23 and a corresponding terminal 23' to come into contact with each other while vertically overlapping each other.

The description of the charging apparatus 2 will be given based on directions of FIGS. 1 and 2, in which a direction connecting two charging terminals 23 is defined as a left-right direction LeRi, a direction crossing at right angles to the left-right direction is defined as a front-rear direction, and a direction crossing at right angles to the left-right direction and the front-rear direction FR is defined as an up-down direction UD.

The main body 21 of the charging apparatus 2 may be connected to a front end of the plate 22 and protrudes upward to form a wall. In this case, the wall may function to prevent separation when the mobile robot moves forward away from a docking area on the plate 22.

The main body 21 may include a power module. The power module is electrically connected to an external power source, to be supplied with external electricity. The power module is electrically connected to the charging terminal 23, to supply the received electricity to the charging terminal 23.

The plate 22 may have a circular shape. The plate 22 may have a similar shape as the shape of the mobile robot. However, the shape of the plate 22 is not limited thereto, and may include simple changes to a polygonal shape and the like, which may be made by those skilled in the art.

The plate 22 has a top surface, on which a space for positioning the mobile robot, the caster guide 24 for guiding the mobile robot, and the charging terminal 23 may be disposed. In this case, a guide pin 25 may be disposed on the top surface of the plate 22.

The mobile robot is docked to an upper end of the plate 22. Referring to FIG. 1, the mobile robot is docked to a circular flat surface, which is referred to as a docking area or a mop positioning part 226.

The mop positioning part 226 is disposed at the rear of the caster guide 24 on the plate 22, and defines an area in which the spin mops 41 of the mobile robot are positioned. The mop positioning part 226 may be disposed at the rear of the charging terminal 23 on the plate 22.

When viewed from above, the mop positioning part 226 is defined as a recess region with open front and rear portions, and closed left and right portions. The caster guide 24 is positioned on a front end of the mop positioning part 226.

An inclined entry surface 227 for facilitating entry of the mobile robot is formed on a rear end of the mop positioning part 226. The inclined entry surface 227 is positioned at the rear end of the plate 22, and is inclined forwardly and upwardly. A length of the inclined entry surface 227 may be equal to or greater than a value obtained by adding together diameters of the two spin mops 41.

The mobile robot may climb the inclined entry surface 227 toward the docking area 226. The inclined entry surface 227 may be formed over a rear edge of the plate 22.

A floor cloth guide 221, which protrudes upward and guides the floor cloth, may be formed on a side surface and/or a front surface of the plate 22. The floor cloth guide 221 is connected to both ends of the inclined entry surface 227 which is formed at the rear of the plate 22.

Two floor cloth guides 221 are disposed, each of which is connected to a left end and a right end of the inclined entry surface 227.

The floor cloth guides 221 may be formed on at least a portion of the circumference of the docking area 226 along with the inclined entry surface 227. An inclined portion may be formed at a rear circumference of the docking area 226, and the floor cloth guide 221 may be formed at the end of the inclined portion. The floor cloth guide 221 prevents the mobile robot from being separated from the docking area 226, and guides the caster to the caster guide 24.

The floor cloth guide 221 has a curvature and protrudes from the top surface of the plate 22. A height of a rear portion of the floor cloth guide 221 may be lower than a height of a front portion of the floor cloth guide 221. The height of the floor cloth guide 221 is inclined upward from the rear to the front.

The floor cloth guide 221 may have a wide rear portion and a narrow front portion. The floor cloth guide 221 may be formed on a portion of the side and front surfaces of the circular plate 22 along the circumference of the circulate plate 22.

Two floor cloth guides 221 are spaced apart from each other in a left-right direction, and a distance between the two floor cloth guides 221 may be larger than a distance between two caster guides 24. The two caster guides 24 may be interposed between the two floor cloth guides 221.

Accordingly, when the mobile robot enters while moving away from the docking area 226, it is possible to guide the caster to the caster guide 24 which is positioned at an inner front portion.

The charging terminal 23 is a device which is electrically connected to the mobile robot to charge a battery provided in the mobile robot. The charging terminal 23 is exposed upward from the top surface of the plate 22 of the charging apparatus 2.

The charging terminal 23 is electrically connected to the power module. The charging terminal 23 may be disposed at the front of the plate 22. A pair of left and right charging terminals 23 may be disposed to be symmetrical to each other with respect to a vertical central axis Ay. It is preferred that the pair of charging terminals 23 are symmetrical to each other with respect to the vertical central axis Ay. The vertical central axis Ay is a line which is parallel to the front-rear direction, and which passes the center of the charging apparatus 2. The charging terminal 23 may include a first charging terminal 23$a$ and a second charging terminal 23$b$.

The mobile robot includes a corresponding terminal 23', which corresponds to the charging terminal 23 of the charging apparatus 2. The corresponding terminal 23' of the mobile robot may be exposed at the bottom of the body 30, so as to be electrically connected to the charging terminal 23 of the charging apparatus 2. The charging terminal 23' of the mobile robot may be disposed at a front end of the body 30.

Figure 4:
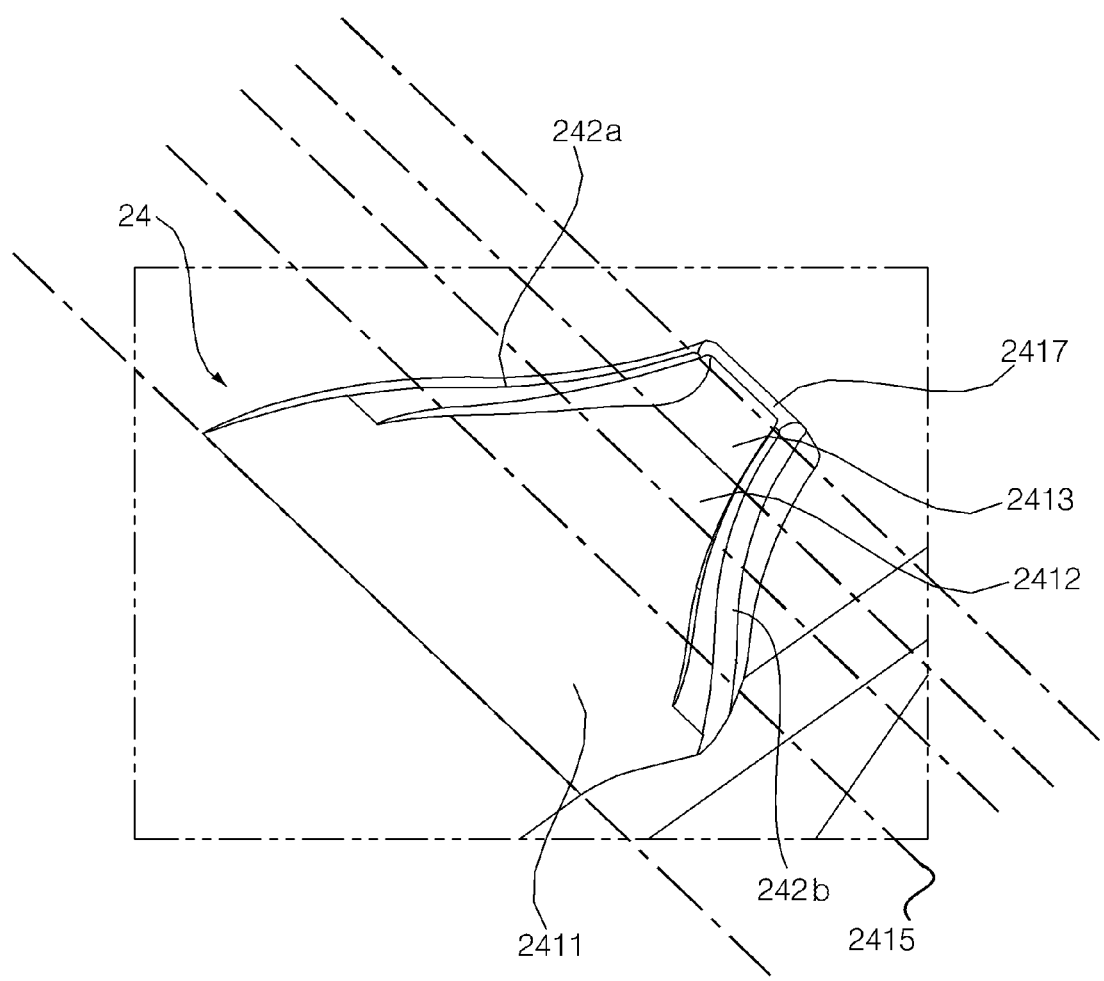
FIG. 4 is a perspective view of a caster guide.

The shape of the caster guide 24 will be described below with reference to FIG. 4.

The caster guide 24 may guide a moving direction of the mobile robot; and as the mobile robot moves forward, the caster guide 24 may have a structure for increasing a height of one end of the mobile robot above a reference height, and then reducing the height again. Here, the reference height refers to a height of the mop positioning part 226.

The caster guide 24 may be formed as a part of the top surface of the plate 22, or may be connected to the top surface of the plate 22 as a separate member. The caster guide 24 is disposed at the rear of the charging terminal 23, and is disposed at the front of the mop positioning part 226.

The caster guide 24 may include: a guide surface 241, on which the caster, being in contact with the guide surface 241, moves by rolling; a separation prevention wall 242 which is disposed on a side surface of the guide surface 241; and a stopper 2417 which is disposed at the front of the guide surface 241. A pair of left and right caster guides 24 may be formed with respect to the vertical central axis Ay. The pair of caster guides 24 may be symmetrical to each other with respect to the vertical central axis Ay.

The caster moves by rolling on the guide surface 241 from the rear to the front. The guide surface 241 may form a horizontal surface in a left-right cross section, or a surface having an angle of less than 5 degrees from the horizontal.

The left/right guide surfaces 241 may have a low middle portion and high side portions in the left-right cross section. In another example, the left/right guide surfaces 241 may be inclined downward toward the vertical central axis in the left-right cross section. In the left-right cross section, the left guide surface 241 is inclined downward toward the right side and the right guide surface 241 is inclined downward toward the left side.

Accordingly, while the caster climbs the guide surfaces 241, a force acting in the opposite direction of the vertical central axis is exerted on the caster, causing the caster to be located exactly at the center of the plate 22 and to enter the plate 22.

Each guide surface 241 may include a first guide surface 2411 and a second guide surface 2412. Further, each guide surface 241 may include the first guide surface 2411, the second guide surface 2412, and a third guide surface 2413.

The first guide surface 2411 has a slope, which is inclined forwardly and upwardly in a front-rear cross section. A rear end of the first guide surface 2411 is connected to the plate 22, and a front end thereof is connected to a rear end of the second guide surface 2412 which will be described later.

A slope formed by an extension line of the rear end and the front end of the first guide surface 2411 is lower than an inclination formed by corners at a lowest end and a front rear end of the mobile robot. Accordingly, before the corner at the front lower end of the mobile robot collides with the first guide surface 2411, the caster arrives at the first guide surface 2411 to climb the slope.

The caster moves forward by rolling on the plate 22. The caster first meets the rear end of the first guide surface 2411, and climbs the slope of the first guide surface 2411 by rolling. The first guide surface 2411 has a wide rear portion and a narrow front portion.

By considering weak forward force of the mobile robot, the slope of the first guide surface 2411 may be set in a range of one to ten degrees.

The shape of the first guide surface 2411 will be described for each embodiment with reference to FIGS. 6A to 6D.

Figure 6A:
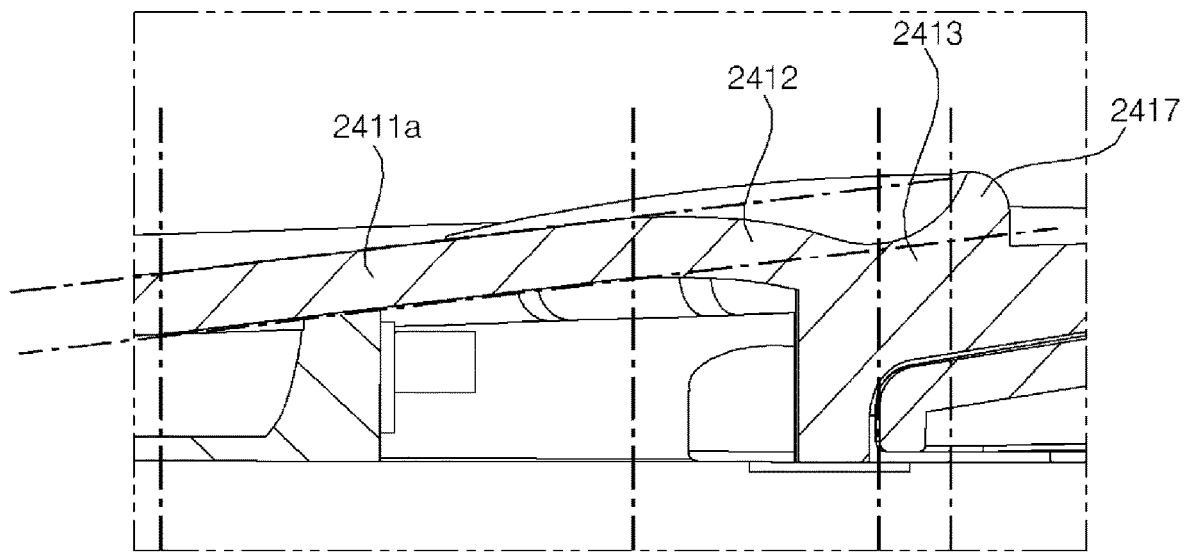
FIGS. 6A to 6D are cross-sectional views of various shapes of a first guide surface.

FIG. 6A illustrates a first embodiment, in which when viewed from the right side, a first guide surface 2411*a* may form a slope having a predetermined inclination. A connection portion between the rear end of the first guide surface 2411*a* and the plate 22 may be rounded. A connection portion between the front end of the first guide surface 2411*a* and the rear end of the second guide surface 2412 may be rounded.

Figure 6B:
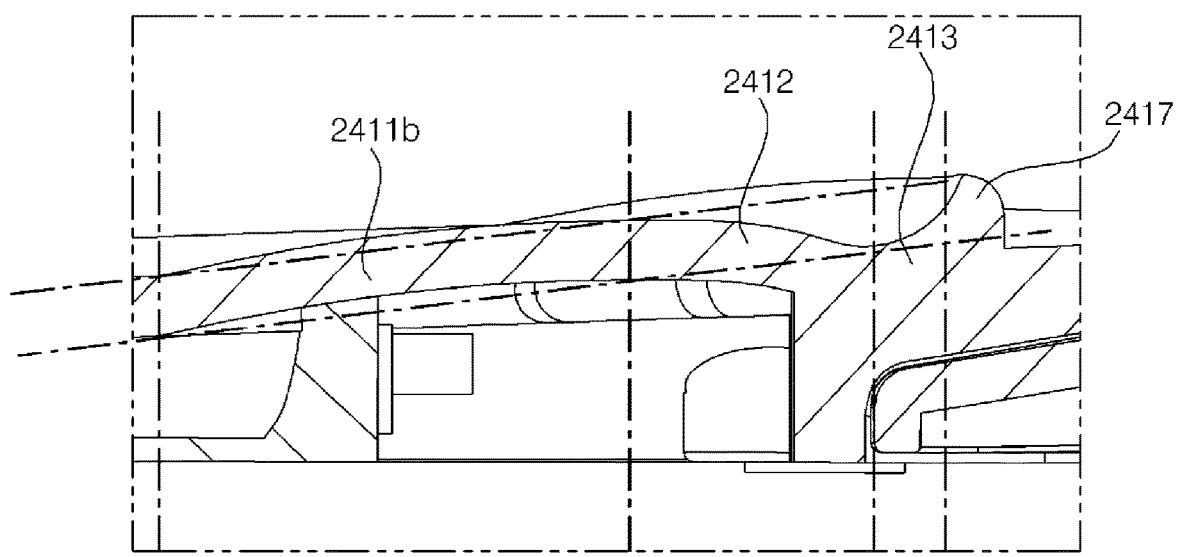

FIG. 6B illustrates a second embodiment, in which when viewed from the right side, a first guide surface 2411*b* may have a slope with an inclination decreasing gradually. A connection portion between the rear end of the first guide surface 2411*b* and the plate 22 may be rounded. If the inclination of the first guide surface 2411*b* decreases gradually, the inclination changes most significantly at the rear end of first guide surface 2411*b*, such that it is possible to accurately detect a time when the caster enters the caster guide 24.

Figure 6C:
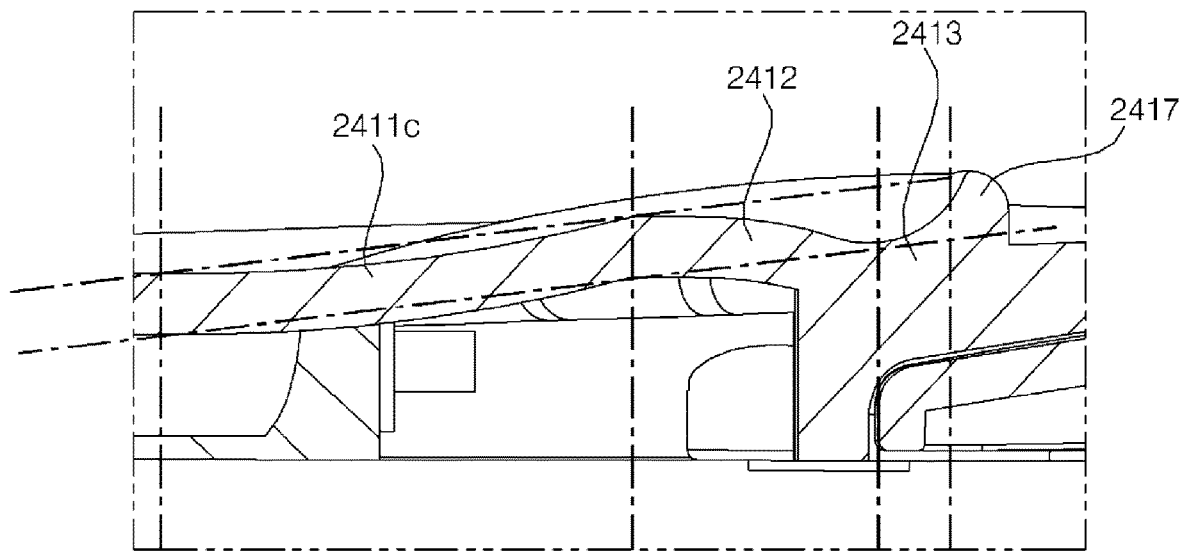

FIG. 6C illustrates a third embodiment, in which when viewed from the right side, a first guide surface 2411*b* may have a slope with an inclination increasing gradually. A connection portion between the front end of the first guide surface 2411*c* and the rear end of the second guide surface 2412 may be rounded. If the inclination of the first guide surface 2411*c* increases gradually, the inclination changes smoothly at the rear end of the first guide surface 2411*c*, such that the caster may readily enter the first guide surface 2411*c*. By contrast, the inclination changes most significantly at a connection portion between the first guide surface 2411*c* and the second guide surface 2412, such that it is possible to accurately detect a time when the caster enters the second guide surface 2412.

Figure 6D:
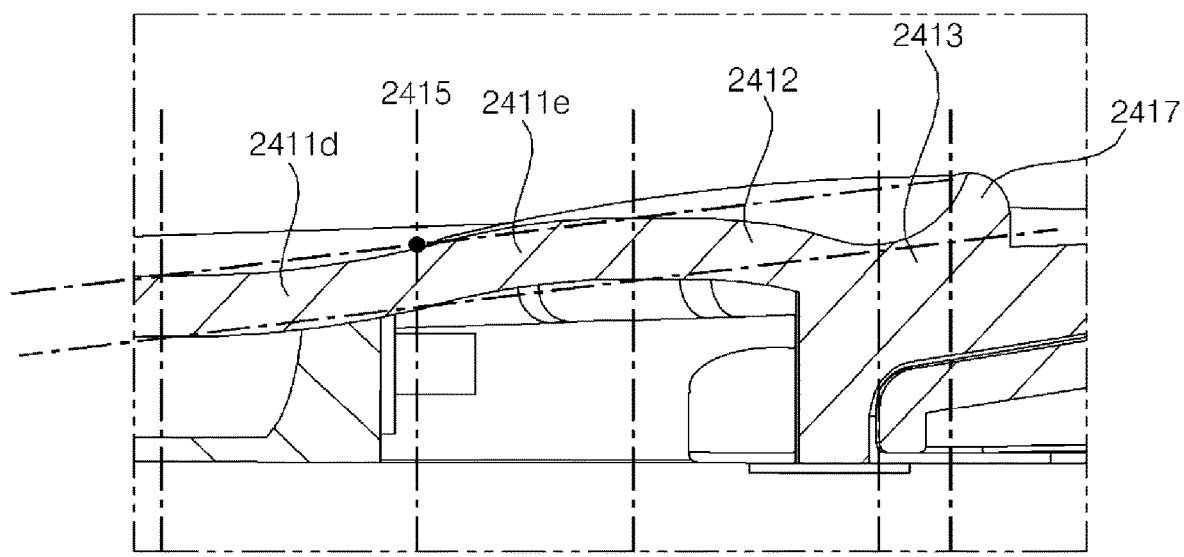

FIG. 6D illustrates a fourth embodiment, in which when viewed from the right side, the first guide surfaces 2411*d* and 2411*e* may have an infection point 2415 which may be located preferably in the middle of the first guide surface. However, the location of the infection point 2415 is not limited thereto, and may be readily changed by those skilled in the art.

An inclination of the slope at a rear end (2411*d*) with respect to the inflection point increases gradually, and an inclination of the slope at a front end (2411*e*) with respect to the inflection point decreases gradually. When viewed from the side of the first guide surface, an S-shaped slope is formed. In this case, as the inclination at the rear end (2411*d*) of the first guide surface changes smoothly, the caster may readily enter the first guide surface 2411*d*; and as an inclination at a connection portion between the front end (2411*e*) of the first guide surface and the rear end of the second guide surface 2412 changes smoothly, the caster may readily enter the second guide surface 2412, thereby minimizing a reaction force acting on the caster.

The second guide surface 2412 may have a slope, which is inclined forwardly and downwardly in a front-rear cross section. The caster may move downward along the second guide surface 2412. While moving toward the front end of the second guide surface 2412, the front end of the mobile robot is lifted up and let down, causing the corresponding terminal 23', included in the body 3, to come into contact with the charging terminal 23 of the charging apparatus 2.

The third guide surface may have a slope, which is inclined forwardly and upwardly in a front-rear cross section. A rear end of the third guide surface 2413 is connected to the front end of the second guide surface 2412. A connection point between the second guide surface 2412 and the third guide surface 2413 is located at a stable position, at which the caster may be seated. It is preferred that before the caster reaches the third guide surface 2413, the corresponding terminal 23' and the charging terminal 23 may come into contact with each other.

Figure 5:
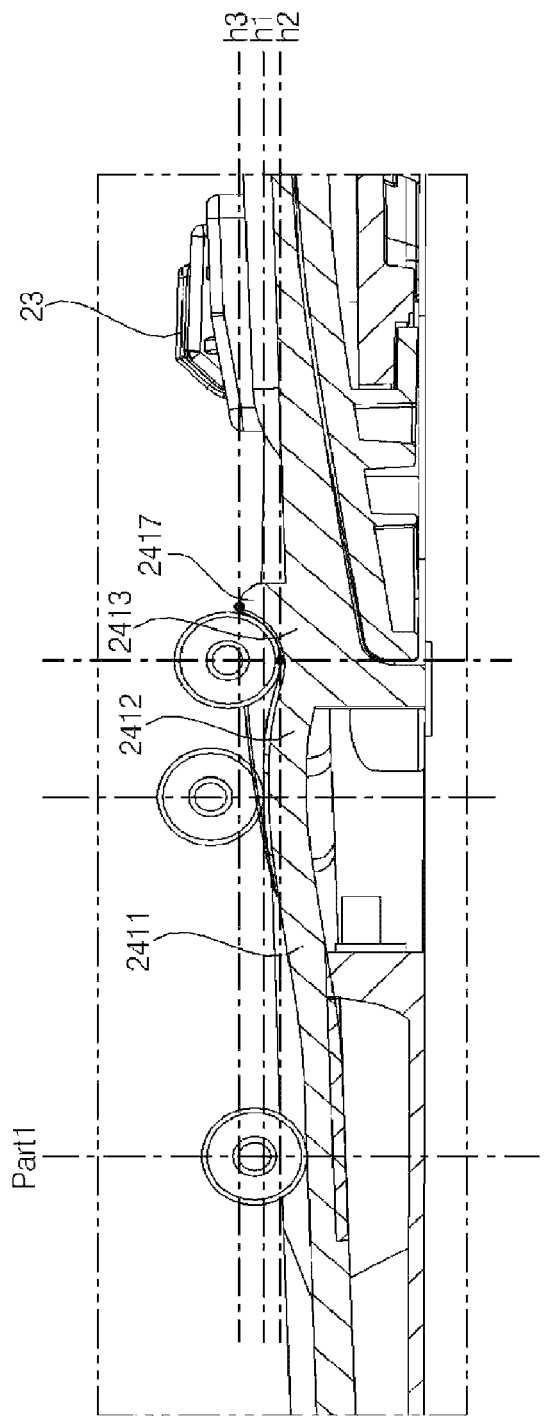
FIG. 5 is a use state view of a caster which moves a caster guide.

A height of the guide surface, formed by the cater guide, will be described below with reference to FIG. 5.

A height h1 of the connection portion between the first guide surface and the second guide surface may be greater than a height h2 of the connection portion between the second guide surface and the third guide surface. As the height h1 of the connection portion between the first guide surface and the second guide surface is greater than the height h2 of the connection portion between the second guide surface and the third guide surface, the corresponding terminal 23' may move toward the charging terminal 23 from above.

The height h2 of the connection portion between the second guide surface and the third guide surface may be lower than a height h4 of the charging terminal 23. More specifically, the height h4 of the charging terminal 23 may be a height of a metal terminal formed on the charging terminal 23. In this case, before the caster arrives at the connection portion between the second guide surface 2412 and the third guide surface 2413, the corresponding terminal 23' and the charging terminal 23 first come into contact with each other while vertically overlapping each other, such that a portion of the load on the mobile robot is exerted on the overlapping charging terminal 23, thereby producing an effect of further increasing the contact between the terminals. In addition, a portion of the load on the floor cloth is distributed to the charging terminal 23, thereby producing an effect of further extending life of a floor cloth. Furthermore, a portion of the load on the caster is distributed to the charging terminal 23, thereby producing an effect of further increasing life of a caster. Moreover, if the caster is provided with a cliff sensor, the cliff sensor may detect a wheel drop occurring in the caster, such that it is possible to check whether the mobile robot is appropriately docked with the charging apparatus 2.

The caster guide 24 may further include the separation prevention wall 242 which defines a surface crossing the guide surface 241 at a side end of the guide surface 241. The separation prevention wall 242 may be disposed at the left and right ends of the guide surface 241, may extend in a front-rear direction, and may define a surface having a height in an upward direction.

Specifically, the separation prevention wall 242 may protrude upward from the left and right ends of the guide surface 241.

The separation prevention wall 242 may be formed on at least one or more side ends of the first guide surface 2411c to the third guide surface 2413. The separation prevention wall 242 may function to prevent the caster, moving on the guide surface 241, from being separated from the guide surface 241.

The separation prevention wall 242 includes a first separation prevention wall 242a, which protrudes upward from the left end of the guide surface 241, and a second separation prevention wall 242b which protrudes upward from the right end of the guide surface 241. A distance between the first separation prevention wall 242a and the second separation prevention wall 242b may become narrower from the rear toward the front.

A stopper 2417 will be described below with reference to FIGS. 4 and 7A to 7C.

The stopper 2417 is disposed at the front of the caster guide 24 to prevent the caster from being separated by passing the caster guide 24. The stopper 2417 is connected to the front end of the third guide surface 2413 and protrudes upward. The stopper 2417 may be integrally formed with the first guide surface 2411c to the third guide surface 2413.

In this case, depending on embodiments, the stopper 2417 may be omitted and the third guide surface 2413 may act as the stopper 2417.

A height h3 of a highest point of the stopper 2417 may be greater than the height 1 of the connection portion between the first guide surface and the second guide surface. According to the principle of the conservation of energy, if the height h1 of the connection portion between the first guide surface and the second guide surface is greater than the height h3 of the highest point of the stopper 2417, a problem occurs in that the caster may be separated by passing the stopper 2417. Accordingly, by having the height h3 of the highest point of the stopper 2417, which is greater than the height h1 of the connection portion between the first guide surface and the second guide surface, it is possible to prevent separation of the caster ($m*g*h1 < m*g*h3$).

The shape of the stopper 2417 will be described below with reference to FIGS. 7A to 7C.

Figure 7A:
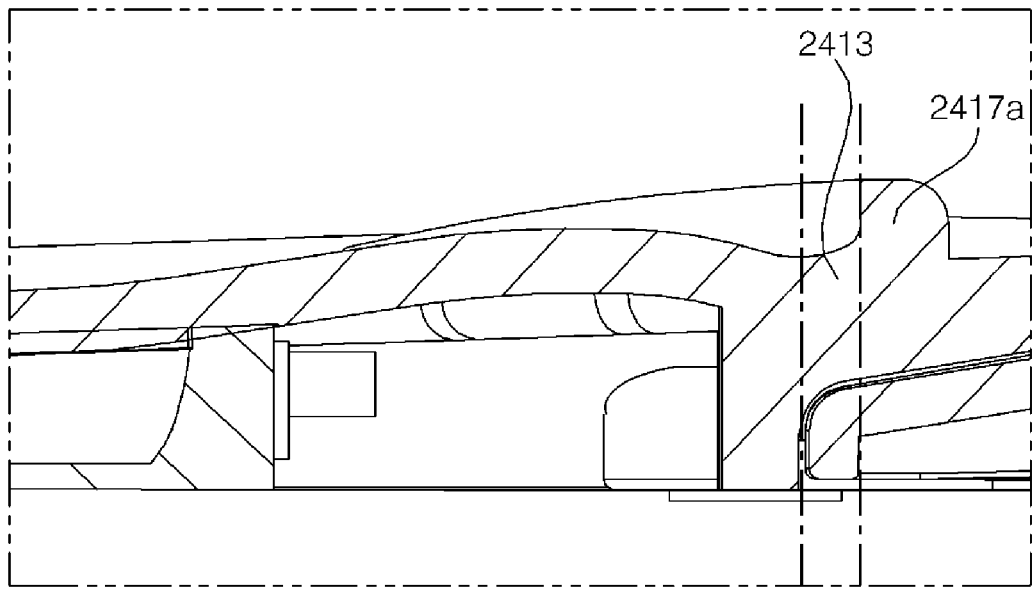
FIGS. 7A to 7C are cross-sectional views of various shapes of a stopper.

Referring to FIG. 7A, when viewed from the right surface, the stopper 2417 may have a surface which is perpendicular to the ground surface.

Figure 7B:
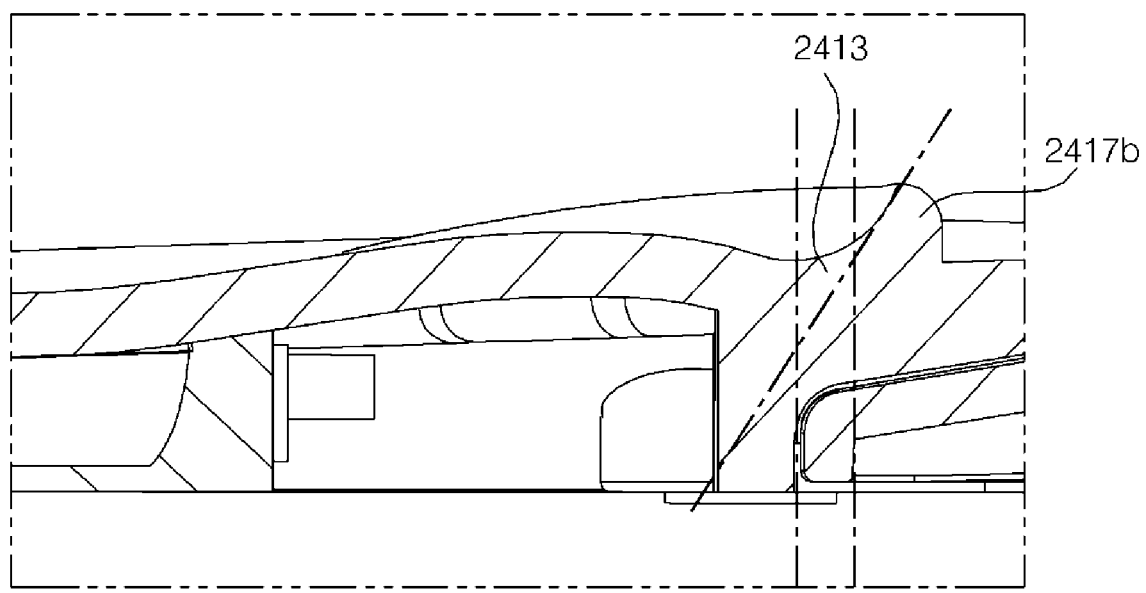

Alternatively, referring to FIG. 7B, when viewed from the right side, the stopper 2417 may have a slope, which is inclined forwardly and upwardly. Due to an inertial force or an excessive driving force, the mobile robot may move forward beyond the front end of the third guide surface 2413. In this case, damage to the caster may be prevented by allowing the forward movement to some degree; and after the inertial force or the like disappears, the mobile robot moves back to be seated at the connection portion between the second guide surface 2412 and the third guide surface 2413.

Figure 7C:
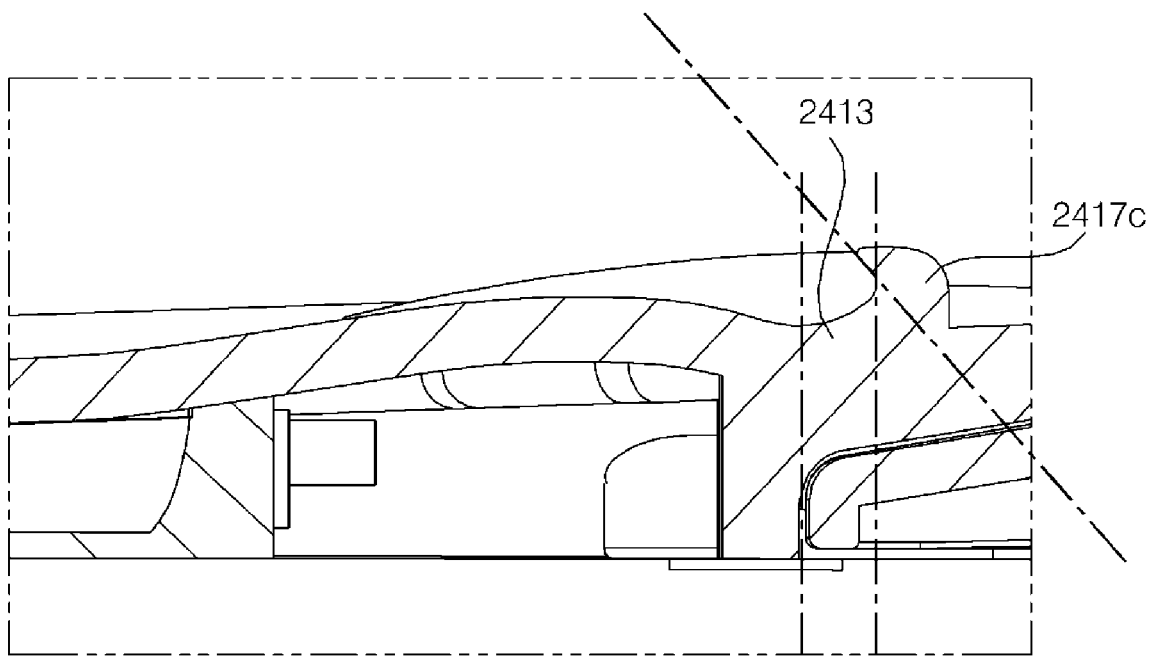
Figure 8:
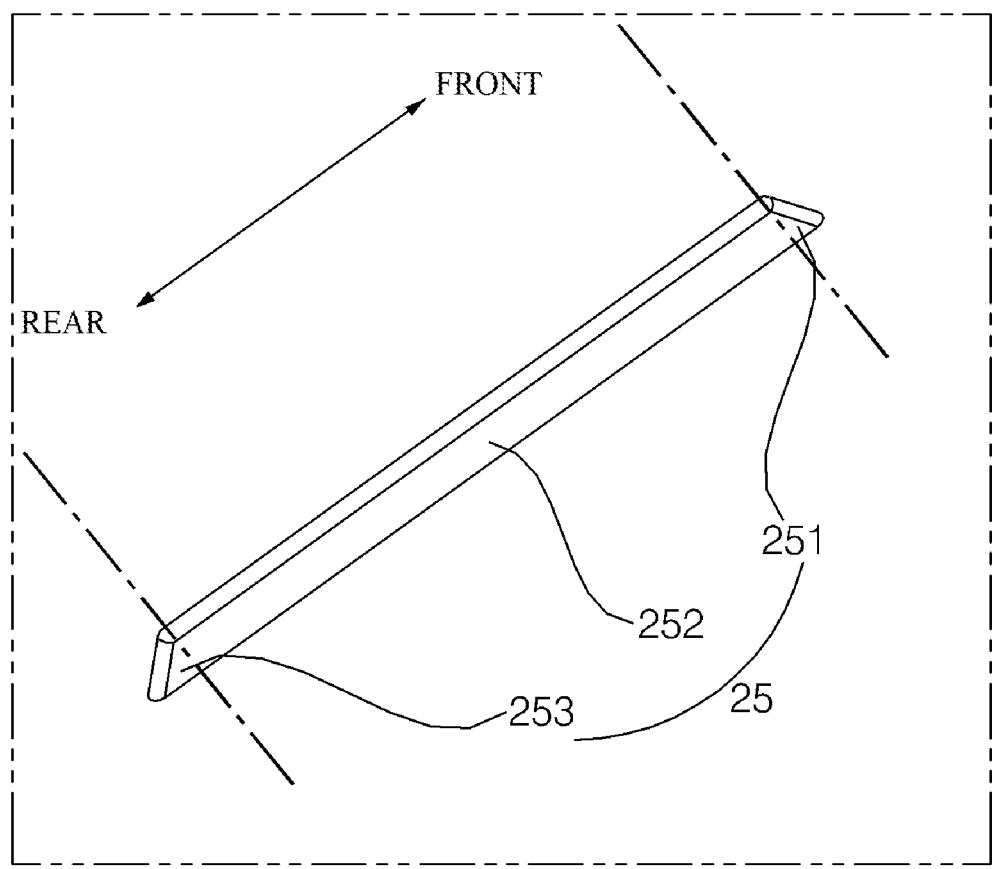
FIG. 8 is a perspective view of a guide pin.

Alternatively, referring to FIG. 7C, when viewed from the right side, the stopper 2417 may have a slope, which is inclined rearwardly and upwardly. If it is required to prevent the mobile robot from moving beyond the front end of the third guide surface 2413, a boundary line for restricting the forward movement of the mobile robot may be determined as the stopper 2417 has the slope which is inclined rearwardly and upwardly.

Referring to FIG. 2A, when the caster guide 24 is viewed from above, a width L3 of the front end of the caster guide 24 is narrower than a width L4 of the rear end of the caster guide 24. When viewed from above, the caster guide 24 may have a narrow front and wide rear shape. The width of the rear end of the first guide may be wider that the width of the front end of the third guide.

A width of the connection portion between the second guide surface 2412 and the third guide surface 2413 may be narrower than a width, obtained by adding a width of the caster to a width of the metal terminal. If the width of the connection portion between the second guide surface 2412 and the third guide surface 2413 is wider than the width obtained by adding the width of the caster to the width of the metal terminal, the charging terminal 23 and the corresponding terminal 23' may not come into contact with each other depending on the position in which the caster is seated. Accordingly, by having the width of the connection portion between the second guide surface 2412 and the third guide surface 2413, which is narrower than the width obtained by adding the width of the caster to the width of the metal terminal, the charging terminal 23 and the corresponding terminal 23' may be electrically connected regardless of a position of the caster, which is positioned at the connection portion between the second guide surface 2412 and the third guide surface 2413.

The caster guide 24 is disposed at the front of the plate 22. A pair of caster guides may be disposed on both sides with respect to the vertical central axis Ay.

The caster guide 24 may be disposed at the rear of the charging terminal 23. In the mobile robot, the corresponding terminal 23' may be disposed at the front of the mobile robot, and the caster may be disposed at the rear of a side surface of the corresponding terminal 23'. In order to correspond thereto, the charging terminal 23 is disposed at the front of the plate 22, and the caster guide 24 may be disposed at the rear of a side surface of the charging terminal 23.

With respect to the vertical central axis Ay, a distance L2 from the vertical central axis to the center of the caster guide 24 may be larger than a distance L1 from the vertical central axis to the charging terminal 23.

If the mobile robot has a circular shape, a center position of the caster guide 24, in which the caster is seated, and the metal terminal of the charging terminal 23 may be disposed on the same circle. In the caster guide 24, the connection portion between the second guide surface 2412 and the third guide surface 2413 and the metal terminal of the charging terminal 23 may be disposed on the same circle. Accordingly, in the case where the caster is seated, the charging terminal 23 and the corresponding terminal 23' may vertically overlap each other, and may come into contact with each other to be electrically connected.

A guide pin 25 is disposed at an upper center portion of the plate 22, and is inserted between two spin mops to guide the mobile robot.

The guide pin 25 is disposed at the upper center portion of the plate 22. The guide pin 25 may be disposed in the docking area (mop positioning part 226). Specifically, the guide pin 25 may be disposed at the rear of the charging terminal 23 and the caster guide 24 on the upper portion of the plate 22.

More specifically, the guide pin 25 extends in a first direction (front-rear direction), and an extension line of the guide pin 25 passes through a space between the first charging terminal and the second charging terminal (between a pair of charging terminals 23). The guide pin 25 may be positioned on the vertical central axis Ay.

The guide pin 25 protrudes upward. The guide pin 25 may be integrally formed with the plate 22, or may be formed separately and connected to the plate 22.

The guide pin 25 may extend from the upper center portion of the plate 22 along the vertical central axis Ay. Two spin mops or a rotary plate may be adjacent to both side surfaces of the guide pin 25.

A front end 251 of the guide pin 25 may be disposed at the rear of a rear end of the caster guide 24. Accordingly, before the caster reaches the caster guide 24, the spin mop 41 may first reach the guide pin 25.

A rear end 253 of the guide pin 25 may have a slope which is inclined forwardly and upwardly. Starting from the lower side of the spin mop 41, the spin mop 41 comes into contact with a front end 251 of the guide pin 25, and the guide pin 25 may be smoothly inserted into a space between the spin mops 41 of the mobile robot when the mobile robot enters.

The front end 251 of the guide pin 25 may have a slope which is inclined forwardly and downwardly. Starting from the lower side of the spin mop 41, the spin mop 41 comes into contact with the rear end 253 of the guide pin 25, and the guide pin 25 may be smoothly inserted into a space between the spin mops 41 of the mobile robot when the mobile robot enters.

While the present disclosure has been shown and described with reference to the preferred embodiments thereof, it should be understood that the present disclosure is not limited to the aforementioned specific embodiments, and various modifications and variations may be made by those skilled in the art without departing from the scope and spirit of the disclosed embodiments as defined by the appended claims, and the modified implementations should not be construed independently of the technical idea or prospect of the present disclosure.

According to the present disclosure, the charging apparatus for the mobile robot has one or more of the following effects.

Firstly, when viewed from the side, an arrangement of an upward slope-downward slope-upward slope-stopper is provided, thereby allowing terminals to be readily directed toward a position, in which the terminals may come into contact with each other, in a longitudinal direction (vertical central axis direction).

Secondly, a caster guide has a wide rear portion, into which a caster enters, and a narrow front portion, in which the caster is seated, thereby allowing terminals to be readily directed toward a position, in which the terminals may come into contact with each other, in a traverse direction (left-right direction).

Thirdly, a separation prevention wall is further provided on both sides of a guide surface, thereby preventing separation.

Fourthly, a guide pin, which extends in a front-rear direction, is further included, allowing terminals to be readily directed toward a position, in which the terminals may come into contact with each other.

Fifthly, the charging apparatus and the caster guide protrude upward from the plate, such that a portion of load on the mobile robot is exerted on the charging terminal during docking of the mobile robot, thereby increasing the contact between the terminals and extending life of a floor cloth.

Sixthly, in the present disclosure, the body has a circular shape, and a dry-type module does not protrude outside of the body, such that rotation may be freely made at any position in an area to be cleaned, and a wide width of an agitator may be maintained, thereby allowing a wide range of cleaning, and performing mopping while collecting relatively large foreign materials.

However, the effects of the present disclosure are not limited to the aforesaid, and other effects not described herein will be clearly understood by those skilled in the art from the following description of the appended claims.

What is claimed is:

1. A charging apparatus for a mobile robot, the charging apparatus comprising:
   a main body having a power module;
   a plate connected to a lower end of the main body;
   a charging terminal disposed on an upper surface of the plate and configured to be upwardly exposed, the charging terminal being electrically connected to the power module; and
   a caster guide configured to guide a movement of the mobile robot such that when the mobile robot moves forward, the caster guide is configured to raise a height of one end of the mobile robot to a height above a reference height and subsequently lower the height,
   wherein the caster guide is disposed at a rear of the charging terminal, and a width of a front end of the caster guide is narrower than a width of a rear end of the caster guide,
   wherein the caster guide comprises a guide surface for guiding a caster, and
   wherein the guide surface comprises:
      a first guide surface disposed at a rear of the guide surface and inclined forwardly and upwardly relative to the guide surface;
      a second guide surface disposed at a front end of the first guide surface and inclined forwardly and downwardly relative to the guide surface; and
      a third guide surface disposed at a front end of the second guide surface and inclined forwardly and upwardly relative to the guide surface.

2. The charging apparatus of claim 1, wherein the first guide surface has a predetermined slope.

3. The charging apparatus of claim 1, wherein a slope of the first guide surface gradually decreases along a length of the first guide surface.

4. The charging apparatus of claim 1, wherein a slope of the first guide surface gradually increases along a length of the first guide surface.

5. The charging apparatus of claim 4, wherein the first guide surface further has an inflection point on the slope of the first guide surface,
   wherein the slope of a first portion of the first guide surface disposed adjacent to a rear end with respect to the inflection point gradually increases, and the slope of a second portion of the first guide disposed adjacent to a front end with respect to the inflection point gradually decreases.

6. The charging apparatus of claim 1, wherein a first height of a connection portion between the first guide surface and the second guide surface is greater than a second height of a connection portion between the second guide surface and the third guide surface.

7. The charging apparatus of claim 1, wherein a height of the connection portion between the second guide surface and the third guide surface is greater than a height of the charging terminal.

8. The charging apparatus of claim 1, wherein the caster guide comprises a separation prevention wall disposed on both sides of the guide surface.

9. The charging apparatus of claim 1, wherein the caster guide further comprises a stopper connected to a front end of the third guide surface.

10. The charging apparatus of claim 9, wherein the stopper extends in a direction perpendicular to the plate.

11. The charging apparatus of claim 9, wherein the stopper is inclined forwardly and upwardly relative to the guide surface.

12. The charging apparatus of claim 9, wherein the stopper is inclined rearwardly and upwardly relative to the guide surface.

13. The charging apparatus of claim 9, wherein a height of a highest point of the stopper is greater than the height of the connection portion between the first guide surface and the second guide surface.

14. The charging apparatus of claim 1, wherein a horizontal distance from a vertical central axis of the charging apparatus to the caster guide is greater than a horizontal distance from the vertical central axis to the charging terminal.

15. The charging apparatus of claim 1, further comprising a guide pin disposed at an upper center portion of the plate.

16. The charging apparatus of claim 15, wherein the guide pin extends along a vertical central axis of the plate.

17. The charging apparatus of claim 15, wherein a front end of the guide pin is disposed at a rear of the rear end of the caster guide.

18. The charging apparatus of claim 15, wherein a rear end of the guide pin is inclined forwardly and upwardly.

19. The charging apparatus of claim 15, wherein the front end of the guide pin is inclined forwardly and upwardly.

20. A charging apparatus for a mobile robot, the charging apparatus comprising:
  a main body comprising a power module;
  a plate connected to a lower end of the main body;
  a floor cloth guide protruding upwardly from the plate, the floor cloth guide being configured to guide a floor cloth, the floor cloth guide including a curvature and being formed on a portion of a side surface and a front surface of the plate along a circumference of the plate;
  a first charging terminal and a second charging terminal installed on the plate, the first charging terminal and the second charging terminal being exposed in an upward direction from an upper portion of the plate, and being electrically connected to the power module; and
  a guide pin disposed at a rear of the first charging terminal and a rear of the second terminal on the upper portion of the plate and protruding upward,
  wherein the guide pin extends in a first direction along an axis that passes through a space between the first charging terminal and the second charging terminal.

21. The charging apparatus of claim 20, further comprising a caster guide configured to guide a caster of the mobile robot, the caster guide being disposed on the plate between the guide pin and one of the first charging terminal or the second charging terminal,
  wherein the caster guide comprises a guide surface for guiding the caster, and a separation prevention wall defining a surface crossing the guide surface at a side end of the guide surface.

22. The charging apparatus of claim 21, wherein a width of a front end of the guide surface is greater than a width of a rear end of the guide surface.

23. The charging apparatus of claim 21, wherein the separation prevention wall comprises a first separation prevention wall and a second separation prevention wall protruding upward from both side ends of the guide surface.

24. The charging apparatus of claim 21, further comprising a mop positioning component disposed at a rear of the caster guide on the plate, and defining an area in which spin mops of the mobile robot are positioned.

25. The charging apparatus of claim 24, wherein, when viewed from above, the mop positioning part comprises a recess region with open front and rear portions, and with closed left and right portions.

26. The charging apparatus of claim 24, wherein the guide pin protrudes upwardly from the mop positioning component.

* * * * *